United States Patent
Barnard

(10) Patent No.: US 10,267,684 B1
(45) Date of Patent: Apr. 23, 2019

(54) DEVICE, SYSTEM, AND TECHNIQUE FOR CHARACTERIZING A FOCAL PLANE ARRAY MODULATION TRANSFER FUNCTION

(71) Applicant: The United States of America, as represented by the Secretary of the Air Force, Washington, DC (US)

(72) Inventor: Kenneth J. Barnard, Fairborn, OH (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/889,939

(22) Filed: Feb. 6, 2018

Related U.S. Application Data

(60) Provisional application No. 62/484,086, filed on Apr. 11, 2017.

(51) Int. Cl.
| | |
|---|---|
| *G12B 13/00* | (2006.01) |
| *G01J 5/02* | (2006.01) |
| *G01J 5/52* | (2006.01) |
| *G01J 5/00* | (2006.01) |

(52) U.S. Cl.
CPC .............. *G01J 5/026* (2013.01); *G01J 5/522* (2013.01); *G01J 2005/0048* (2013.01)

(58) Field of Classification Search
CPC .. H04N 1/4092; G01M 11/0292; G01J 5/026; G01J 5/522; G01J 2005/0048
See application file for complete search history.

(56) References Cited

U.S. PATENT DOCUMENTS

| | | | |
|---|---|---|---|
| 5,075,883 A | * | 12/1991 | Friedman ........... G01M 11/0292 356/124.5 |
| 5,600,432 A | | 2/1997 | Lengyel et al. |
| 5,818,572 A | | 10/1998 | Pappas et al. |
| 6,900,884 B2 | | 5/2005 | Alderson et al. |

(Continued)

OTHER PUBLICATIONS

W. Astar, "Optical bandpass filters for detector arrays' modulation transfer function estimation by means of laser speckle," 1996, Optical Engineering, vol. 35, No. 6, pp. 1684-1695. (Year: 1996).*

(Continued)

*Primary Examiner* — Kiho Kim
(74) *Attorney, Agent, or Firm* — AFMCLO/JAZ; Jeff Moore

(57) ABSTRACT

An apparatus, system, and method to characterize a focal plane array. The apparatus includes a speckle field source to generate and emit a plurality of uniform speckle fields, a diamond-shape aperture, and a pedestal to mount the focal plane array at a predetermined distance from the aperture. The diamond-shape aperture shapes the uniform speckle fields from the speckle field source so that the uniform speckle fields have a desired power spectral density at the focal plane array. The desired power spectral density has recoverable aliased regions out to two times the Nyquist frequency of the focal plane array. The system includes a controller to characterize, by computing a modulation transfer function, the focal plane array based on the desired power spectral density of the uniform speckle fields impinging on the focal plane array.

13 Claims, 18 Drawing Sheets

(56) References Cited

U.S. PATENT DOCUMENTS

| | | |
|---|---|---|
| 7,110,020 B2 | 9/2006 | Glenn |
| 7,646,016 B2 | 1/2010 | Duesman et al. |
| 8,217,334 B1 | 7/2012 | Lang et al. |

OTHER PUBLICATIONS

Chen et al., "Sensor modulation transfer function measurement using band-limited laser speckle," 2008, Optics Express, vol. 16, No. 24, pp. 20047-20059. (Year: 2008).*

Barnard, K., et al., "Random laser speckle based modulation transfer function measurement of midwave infrared focal plane arrays," Optical Engineering, vol. 51(8), pp. 083601-1 to 083601-8, Aug. 2, 2012.

Boreman, G., et al., "Generation of laser speckle with an integrating sphere," Optical Engineering, vol. 29(4), pp. 339-342, Apr. 1990.

Ducharme, A., et al., "Improved aperture for modulation transfer function measurement of detector arrays beyond the Nyquist frequency," Optical Engineering, vol. 47(9), pp. 093601-1 to 093601-6, Sep. 5, 2008.

Guérineau, N., et al., "Modulation transfer function measurement of an infrared focal plane array by use of the self-imaging property of a canted periodic target," Applied Optics, vol. 38, Issue 4, pp. 631-637, 1999, Abstract only, 2 pages.

Nagy, P., et al., "Random speckle modulation technique for laser interferometry," Journal of Nondestructive Evaluation, vol. 11, Issue 1, pp. 41-49, Mar. 1992, Abstract only, 4 pages.

Nasibov, A., et al., "The influence of CCD pixel binning option to its modulation transfer function," Proc. of SPIE vol. 7723, pp. 77231A-1 to 72231A-8, May 2010.

Pour, S., et al., "High operating temperature midwave infrared photodiodes and focal plane arrays based on type-II InAs/GaSb superlattices," Applied Physics Letters, 98, pp. 143501-1 to 143501-3, Apr. 4, 2011.

Sprafke, T., et al., "High-Performance Infrared Focal Plane Arrays for Space Applications," OPN, pp. 22-27, Jun. 2008.

* cited by examiner

700

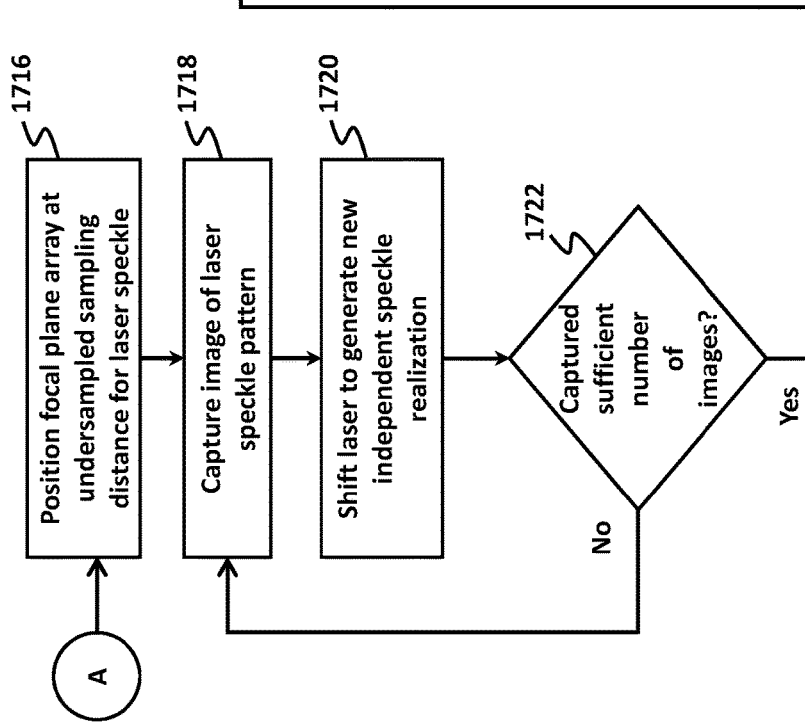
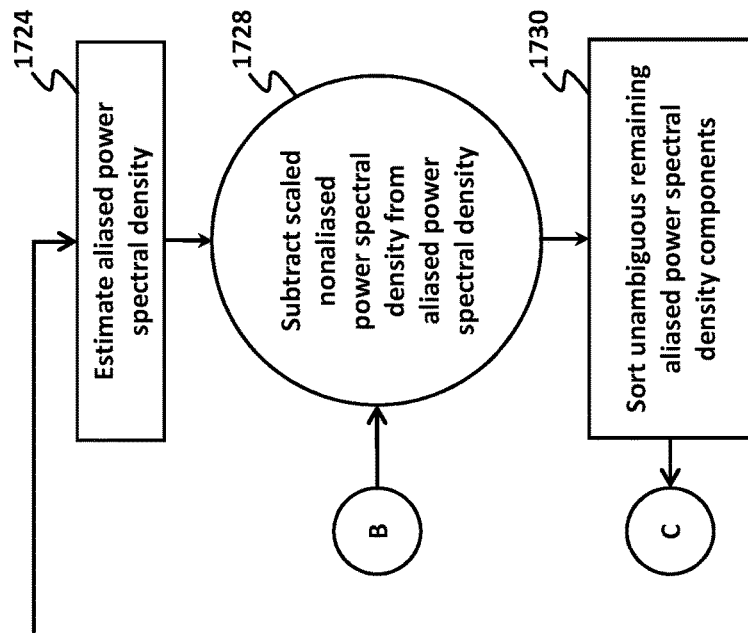
FIG. 17B

DEVICE, SYSTEM, AND TECHNIQUE FOR CHARACTERIZING A FOCAL PLANE ARRAY MODULATION TRANSFER FUNCTION

CROSS-REFERENCE TO RELATED APPLICATION(S)

This application claims the benefit of U.S. Provisional Patent Application No. 62/484,086, filed on Apr. 11, 2017, the contents of which, in its entirety, is herein incorporated by reference.

GOVERNMENT INTEREST

The invention described herein may be manufactured and used by or for the Government of the United States for all government purposes without the payment of any royalty.

BACKGROUND

Field of the Invention

The embodiments herein generally relate to an apparatus, system, and method for characterizing a focal plane array (FPA), particularly by measuring the resolution thereof and determining the modulation transfer function (MTF) of the same.

Background of the Invention

The MTF of an imaging system represents how well the system faithfully images a given object or scene. More specifically, the MTF quantifies the system's ability to resolve spatial frequencies, or in a more common parlance, to resolve objects of a particular size. As the resolution requirements for imaging systems have increased, determining the MIT has become more challenging, particularly for systems having focal plane arrays.

Conventional techniques for measuring the MTF of an imaging system typically use a target that is imaged by the system through intervening optics, with the MTF being measured indirectly as a result. For example, the MTF can be measured by using a spatially varying target, such as a sinusoidal pattern, using a specialized target such as a slanted edge target, or involve moving a slit between the imaging system and the target to generate a particular image. When a spatially varying target is used, the MTF is measured in a point-to-point manner. When a slanted edge target is used, individual detectors in the focal plane array sample a sharply defined edge at slightly different positions, and thereby generate an oversampled edge image that forms a basis for deriving the MTF. Similarly, when a slit is moved between the imaging system and the target, an oversampled slit image can be generated from which the MTF can be derived, although, in such instances, the effects of imaging the finite width slit must be removed numerically from the results. This is true for all the methods just mentioned because all rely on intervening optics to measure the MTF. As a result, the intervening optics must be carefully characterized so that their effects can be removed from the MTF determination. When using these techniques to characterize focal plane arrays, the increasing resolution demands on these arrays have made employing these techniques problematic.

A focal plane array is an array of light-sensing sensors, or pixels, that are disposed at the focal plane of the imaging system. They can be found in such things as thermal cameras, astronomical instruments, inspection systems, medical imaging devices, bolometers, weapon guidance systems and other kinds of measuring units and imaging systems that are designed to visualize phenomena in various ranges of the electromagnetic spectrum. A focal plane array includes an array of detectors with an associated pitch, which determines the resolution the array. To increase the resolution, the detector pitch is decreased, and this decreasing pitch has made it challenging to use the conventional techniques above because of such things as diffraction effects that are a by-product of the array's decreasing detector pitch.

An alternative to indirect measurement of the MTF is to measure the MTF directly, meaning, without intervening optics. Direct measurement of the MTF to characterize a focal plane array can use a random process at the input of the array, such as a random laser speckle. Because a focal plane array is a linear system, by using a random process at the input, the focal plane array can be characterized in terms of its MTF using the input-output relationship of the power spectral density function. This technique allows the MTF to be measured directly without intervening optics, but typically requires special considerations and design choices when employed.

For instance, measuring the MTF of a focal plane array directly using a random process may be based on generating a uniform delta-correlated random speckle field that propagates through an aperture and impinges on a focal plane array at a specific distance from the aperture. Generally, such measurements are valid for spatial frequencies less than the Nyquist folding frequency. The Nyquist folding frequency reflects the sampling limitations of the array and is determined by the array's detector pitch. Unless special configurations are used, measuring the MTF using a random uniform speckle field approach is limited in this manner.

For example, a previously reported solution for extending the spatial frequency limit of the measurement used a specially designed cross-shaped aperture function. This approach has drawbacks. By using a small aperture, transmissions occurring therethrough lower the signal-to-noise ratio of the measurement. Also, the measurement is not self-normalizing, meaning the measured MTF is not automatically normalized to a value of unity at zero spatial frequency. These limitations can lead to inaccuracies in the MTF measurement that require extrapolation and offset adjustments to correct. Thus, a need exists to overcome these limitations, at least in part, without introducing intervening optics.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, an embodiment herein provides an apparatus to characterize a focal plane array, the apparatus comprising a speckle field source for generating and emitting a uniform speckle field; and a pedestal to dispose the focal plane array at a predetermined distance from a diamond-shape aperture disposed between the speckle field source and the focal plane array, the diamond-shaped aperture being configured to receive and shape the uniform speckle field to have, at the predetermined distance, a predetermined power spectral density comprising recoverable aliased regions out to about two times the Nyquist frequency of the focal plane array. The apparatus may further comprise no intervening optics between the diamond-shape aperture and the focal plane array. The diamond-shape aperture may comprise an opaque sheet less than 0.05 inches thick at a diamond-shape opening. The speckle field source may comprise a narrow linewidth laser to emit source radiation; and a speckle field generator to generate a uniform speckle field from the source radiation and emit the uniform speckle field. The apparatus may further comprise disposed between the narrow linewidth laser and the speckle field generator, at least one of a mirror to reflect at least a portion of the source radiation, a diffraction grating to narrow the source radiation, a beam shaping light pipe to remove spatial mode variations in the source radiation, and a collimator to collimate the source radiation.

Another embodiment provides a system to characterize a focal plane array, the system comprising a speckle field source to emit a plurality of uniform speckle fields; a focal plane array disposed at a predetermined distance from a diamond-shape aperture disposed between the speckle field source and the focal plane array, the diamond-shape aperture being configured to shape the plurality of uniform speckle fields to have, at the predetermined distance, a predetermined power spectral density comprising recoverable aliased regions beyond the Nyquist folding frequency of the focal plane array; a processor to generate an output power spectral density function from the focal plane array; and a controller configured to measure the output power spectral density function from the focal plane array in response to the plurality of uniform speckle fields impinging on the focal plane array, and compute a modulation transfer function of the focal plane array based on the predetermined power spectral density and the measured output power spectral density. The speckle field source may comprise a narrow linewidth laser to emit source radiation; and a speckle field generator to generate a uniform speckle field from the source radiation and emit the uniform speckle field, wherein the speckle field generator comprises at least one of an integrating sphere and a diffuser. The system may further comprise a polarizer to select a single linear polarization to increase contrast of the laser speckle in the uniform speckle field. The system may further comprise a randomizer configured to adjust the speckle field source to generate a plurality of statistically independent realizations of the uniform speckle field. The system may further comprise a filter configured to limit the spectral wavelength passband to the focal plane array at the predetermined distance from the aperture and expose the focal plane array to the predetermined power spectral density function.

The system may further comprise at least one of a mirror to reflect at least a portion of the source radiation, a diffraction grating to narrow the source radiation, a beam shaping light pipe to remove spatial mode variations in the source radiation, and a collimator to collimate the source radiation. The controller may be configured to receive a first data set of at least one random uniform speckle field collected by the focal plane array under aliased condition, to receive a second data set of random uniform speckle field collected by the focal plane array under non-aliased condition, to produce a signal without aliasing artifacts from the first data set and the second data set, and to compute a modulation transfer function of the focal plane array based on the produced signal. The first data set and the second data set may be collected by at least one of an approximation in the Fresnel optical regime and a numerical computation from the Rayleigh-Summerfeld diffraction formula.

Another embodiment provides a method of characterizing a focal plane array, the method comprising generating a plurality of uniform speckle fields; radiating each uniform speckle field on a diamond-shape aperture comprising a transmission value of one inside a diamond-shape pattern and zero outside of the diamond-shape pattern to shape the uniform speckle field to have a predetermined power spectral density at the focal plane array when at a predetermined distance from the aperture; and computing, for each uniform speckle field, a modulation transfer function of the focal plane array based on the predetermined power spectral density, and an output power spectral density from the focal plane array, wherein the output power spectral density is in response to the uniform speckle field impinging on the focal plane array. The generating of a uniform speckle field may comprise irradiating at least one of an integrating sphere and a diffuser. The method may further comprise polarizing the uniform speckle field prior to radiating the uniform speckle field on the aperture. The method may further comprise randomizing each uniform speckle field from the other uniform speckle fields. The method may further comprise spectral wavelength passband filtering the uniform speckle field prior to the focal plane array. The computing may comprise receiving a first data set of at least one random uniform speckle field collected by the focal plane array under aliased condition; receiving a second data set of at least one random uniform speckle field collected by the focal plane array under non-aliased condition; producing a signal without aliasing artifacts from the first data set and the second data set; and computing the modulation transfer function of the focal plane array based on the produced signal. The first data set and second data set may be collected by at least one of an approximation in the Fresnel optical regime and a numerical computation from the Rayleigh-Summerfeld diffraction formula.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings.

FIGS. 17A and 17B present a detailed flow diagram illustrating an exemplary method of measuring the resolution of a focal plane array according to an embodiment herein.

DETAILED DESCRIPTION OF THE INVENTION

Figure 1:
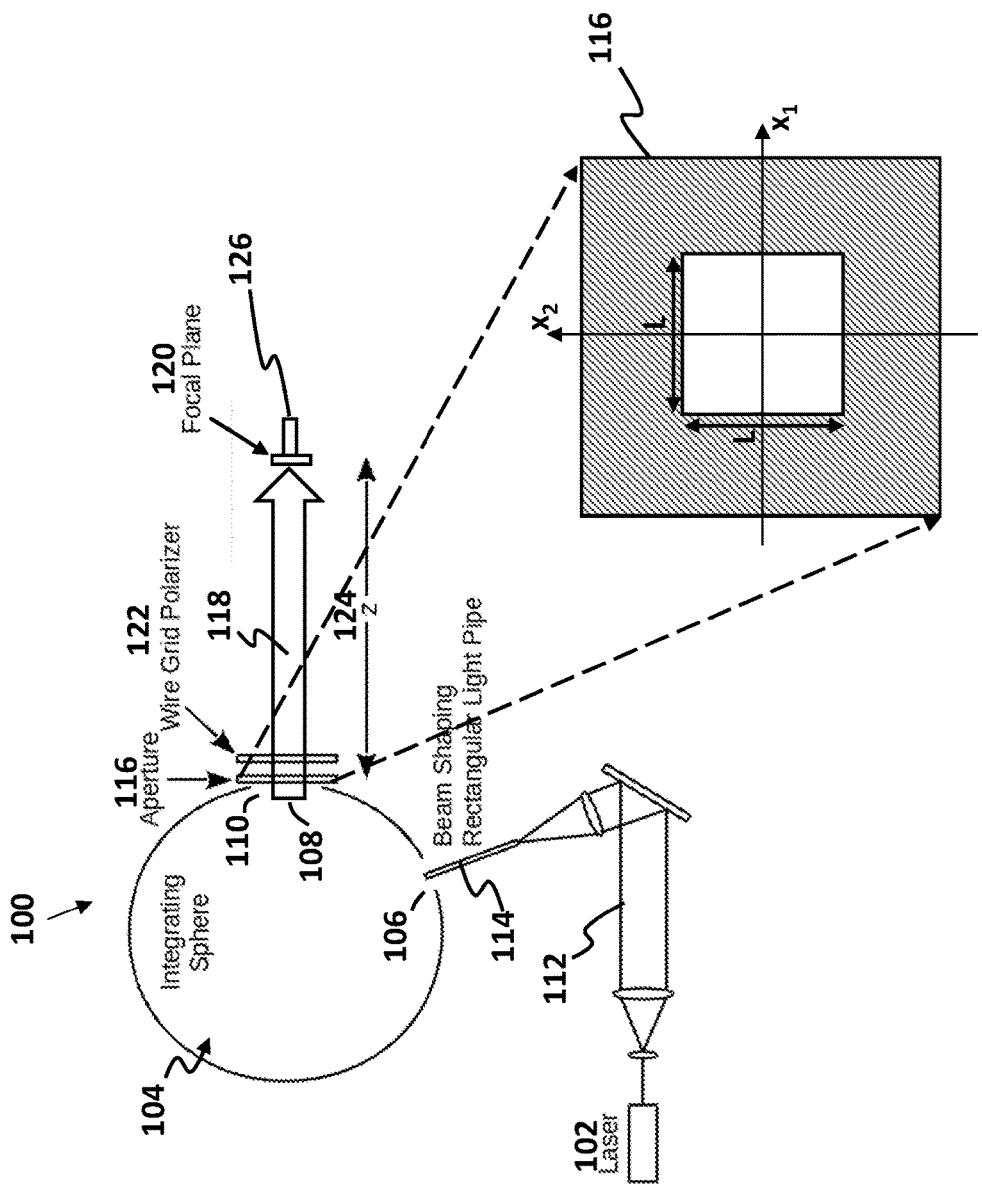
FIG. 1 is a schematic of a measurement apparatus for the MTF of a focal plane array having a square aperture with a transmission value of one inside the square and zero outside the square.

Embodiments of the disclosed invention, its various features and the advantageous details thereof, are explained more fully with reference to the non-limiting embodiments that are illustrated in the accompanying drawings and detailed in the following description.

Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

It will be understood that when an element or layer is referred to as being "on", "connected to", or "coupled to" another element or layer, it can be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

In the drawings, the size and relative sizes of layers and regions may be exaggerated for clarity. Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" refers to able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

Embodiments herein provide a diamond-shape aperture for directly measuring the MTF of a focal plane array using random uniform speckle field techniques. When employed as described herein, the MTF is automatically normalized to a value of unity at zero spatial frequency. Because a diamond-shaped aperture is used, the embodiments herein do not suffer from reduced transmissions through a small aperture. In addition, algorithms are described in conjunction with the diamond-shape aperture to yield estimates of the MTF over a spatial frequency domain up to twice the Nyquist folding frequency. Embodiments herein provide a hardware and algorithm/software methodology to measure the resolution of a focal plane array in terms of MTF beyond sampling limitations of the array, which are determined by the pitch of the individual detectors.

The random laser speckle method for directly measuring the MTF of a focal plane array may be based on generating a uniform delta-correlated random laser speckle field and propagating it through an optical aperture. The speckle field passes through the aperture and impinges on the focal plane array at a specific distance therefrom. The power spectral density of the speckle field can then be measured and compared to an estimate such that the MTF of the array can be determined through a linear system relationship. In other words, by estimating the power spectral density of the measured speckle irradiance at the array, the MTF can be determined based on the power spectral density of the speckle field being measured by the array.

At the array, the estimated power spectral density function of the speckle irradiance can be determined in multiple ways. For example, when the Fresnel propagation approximation is valid, the power spectral density function can be described by the autocorrelation function of the aperture function. The estimated power spectral density can also be computed numerically using the Rayleigh-Summerfeld diffraction formula. It will be appreciated that, in using the above, a linear polarizer may be used to limit the speckle field to a single polarization so that a fully developed random uniform speckle field with maximum contrast will impinge the array.

Referring now to the drawings, and more particularly to FIGS. 1 through 17B, where similar reference characters denote corresponding features consistently throughout, there is shown exemplary embodiments of apparatuses, systems, and methods for measuring the FPA MTF beyond the Nyquist limit using a diamond-shape aperture. In embodiments, a diamond-shape aperture receives and shapes a random uniform speckle field so that it impinges on the array with a predetermined power spectral density function. The predetermined power spectral density function may include recoverable aliased regions out to about two times the Nyquist frequency of the focal plane array.

A comparative measurement set up apparatus 100 used in the thermal midwave infrared band is shown in FIG. 1, although the set up for other wavebands would be similar. A narrow linewidth laser source 102 illuminates an integrating sphere 104 through an input port 106 to generate a uniform speckle field 108 across a larger exit port 110. The laser 102 may incorporate linewidth narrowing devices such as grating structures to ensure sufficient coherence length for laser speckle generation. Such linewidth narrowing devices may be internal or external to the laser 102. The source radiation 112 may be expanded and then focused into the integrating sphere 104 to improve the uniformity of the speckle field 108, such as by creating a high divergence in the beam. Other options include direct fiber coupling into the integrating sphere 104. A light pipe 114 may also be used to remove spatial mode variations in the laser 102 to produce a more uniform speckle field 108. A polarizer 122 may be included to select a single linear polarization necessary to maximize the contrast of the laser speckle. Other methods may be known for generating a uniform speckle field, including using other types of lasers such as distributed feedback lasers and random microlens arrays instead of an integrating sphere. In one embodiment the integrating sphere may be a speckle generator.

As shown, the uniform speckle field 108 passes through an aperture 116 for shaping the speckle field 108 such that it has a desired power spectral density 118 when impinging on focal plane array 120. Exemplary embodiments herein relate to the aperture 116 used to generate the desired power spectral density and an algorithm for computing the MTF of the focal plane array. When so computed, the spatial frequency range of the MTF can exceed the Nyquist folding frequency of the array 120 and extend out to twice the Nyquist folding frequency.

In embodiments, the MTF can be computed using the linear system relationship for random processes given by Equation (1):

$$G_{out}(\omega_1,\omega_2)=G_{in}(\omega_1,\omega_2)|H_{FPA}(\omega_1,\omega_2)|^2, \qquad (1)$$

in the discrete space Fourier transform domain where: $G_{in}$ is the known/computed power spectral density 118 of the random uniform speckle field 108 irradiance impinging on the focal plane array 120; $H_{FPA}$ is the focal plane array transfer function that includes the detector, readout, and electronics; and $G_{out}$ is the power spectral density 118 of the speckle image measured by the focal plane array 120 as reported by Barnard, et al., "Random laser speckle based modulation transfer function measurement of midwave infrared focal plane arrays" Opt. Eng.—Bellingham-International Society for Optical Engineering; United States, 51(8), 083601 (2012), the entire contents of which is herein incorporated by reference for all purposes. The magnitude of the focal plane array transfer function, $|H_{FPA}|$, is defined as the modulation transfer function.

Figure 2:
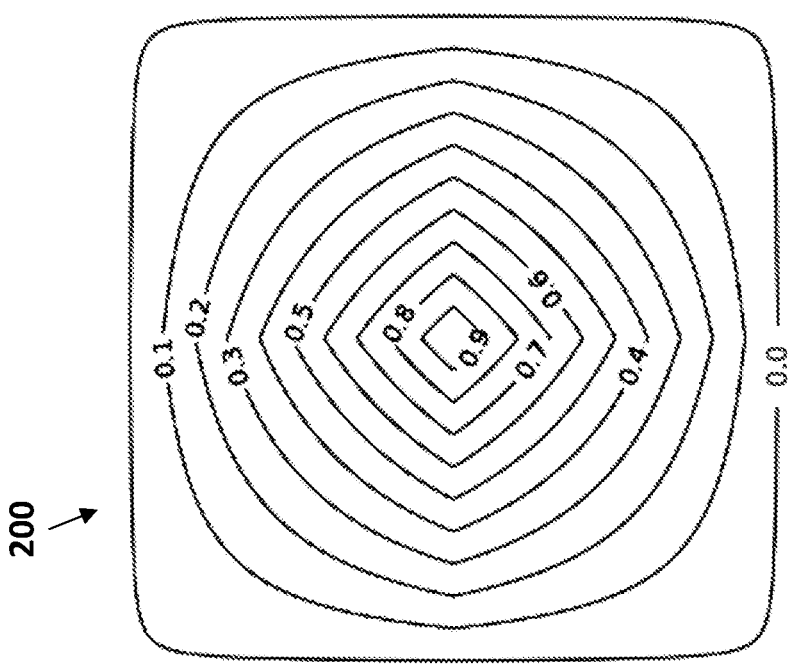
FIG. 2 is a contour plot with arbitrary units of a power spectral density function corresponding to a square aperture such as shown in FIG. 1. The power spectral density is given by the autocorrelation of the aperture.
Figure 3:
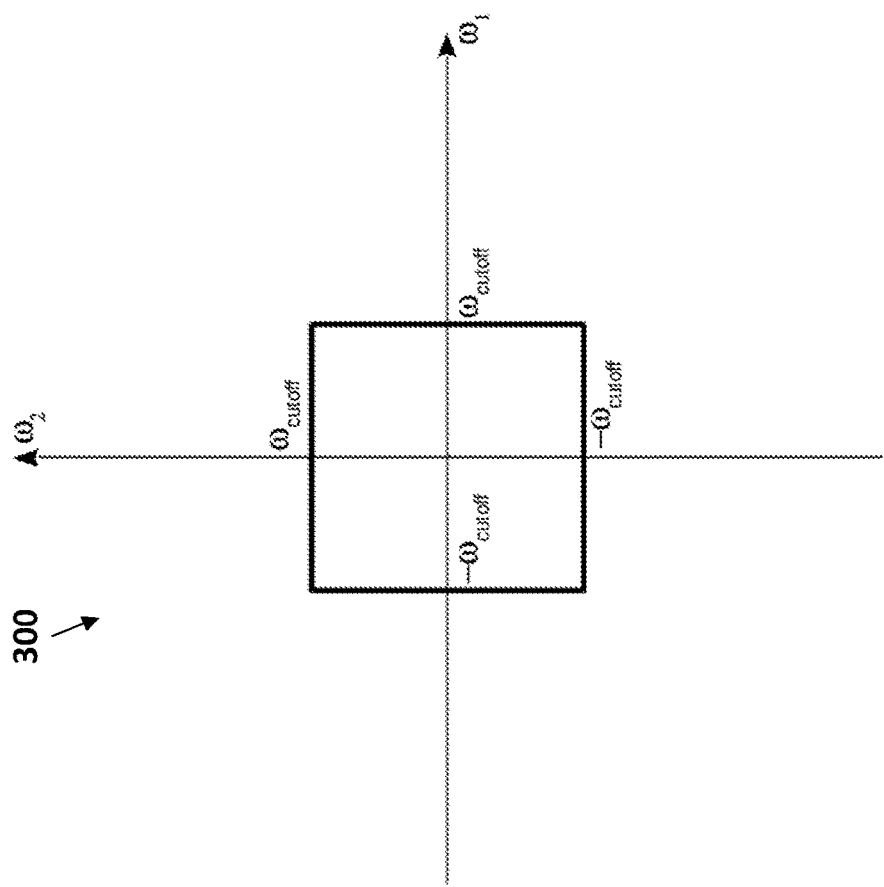
FIG. 3 is a schematic diagram of a region of support for the power spectral density function of a square aperture such as shown in FIG. 1.

Under conditions where the Fresnel approximation is valid, the input power spectral density function, $G_{in}$, can be given by the autocorrelation of the aperture shape plus a delta function at zero spatial frequency corresponding to a DC bias that is later removed from the computations. A separable square aperture function of a comparative example is given as Equation (2):

$$A_{square}(x_1, x_2) = rect\left(\frac{x_1}{L}\right)rect\left(\frac{x_2}{L}\right), \qquad (2)$$

where L is the width of the aperture 116 along the axes ($x_1$, $x_2$) as shown in FIG. 1. In the case of a valid Fresnel approximation, the corresponding power spectral density function is written as a separable triangle function in Equations (3) and (4):

$$G_{in}(\omega_1, \omega_2) = tri\left(\frac{\omega_1}{\omega_{cutoff}}\right)tri\left(\frac{\omega_2}{\omega_{cutoff}}\right) \quad (3)$$

and $$\omega_{cutoff} = 2\pi d_{pitch}\frac{L}{\lambda z} \quad (4)$$

where $d_{pitch}$ is the focal plane array 120 detector pitch, $\lambda$ is the laser 102 wavelength, z is the distance 124 between the aperture 116 and focal plane array 120, and $\omega_{cutoff}$ is the cutoff spatial frequency of the power spectral density function in normalized angular frequency space and determines the support of $G_{in}$. A contour plot 200 of this function and the region of support 300 are shown in FIGS. 2 and 3.

Since the focal plane array 120 performs a discrete sampling of the incident irradiance, the measured power spectral density is a periodic function in frequency space with a Nyquist folding frequency of $\omega_{Nyquist}=\pi$, or $\zeta_{Nyquist}=\frac{1}{2}d_{pitch}$ in the continuous spatial frequency domain. Provided the physical parameters are chosen properly, the cutoff frequency of the power spectral density will be less than the Nyquist folding frequency and aliasing will not occur. This is shown in FIG. 4, where the periodic nature of the support for the power spectral density function is indicated and there is no overlap between the components 406.

Figure 4:
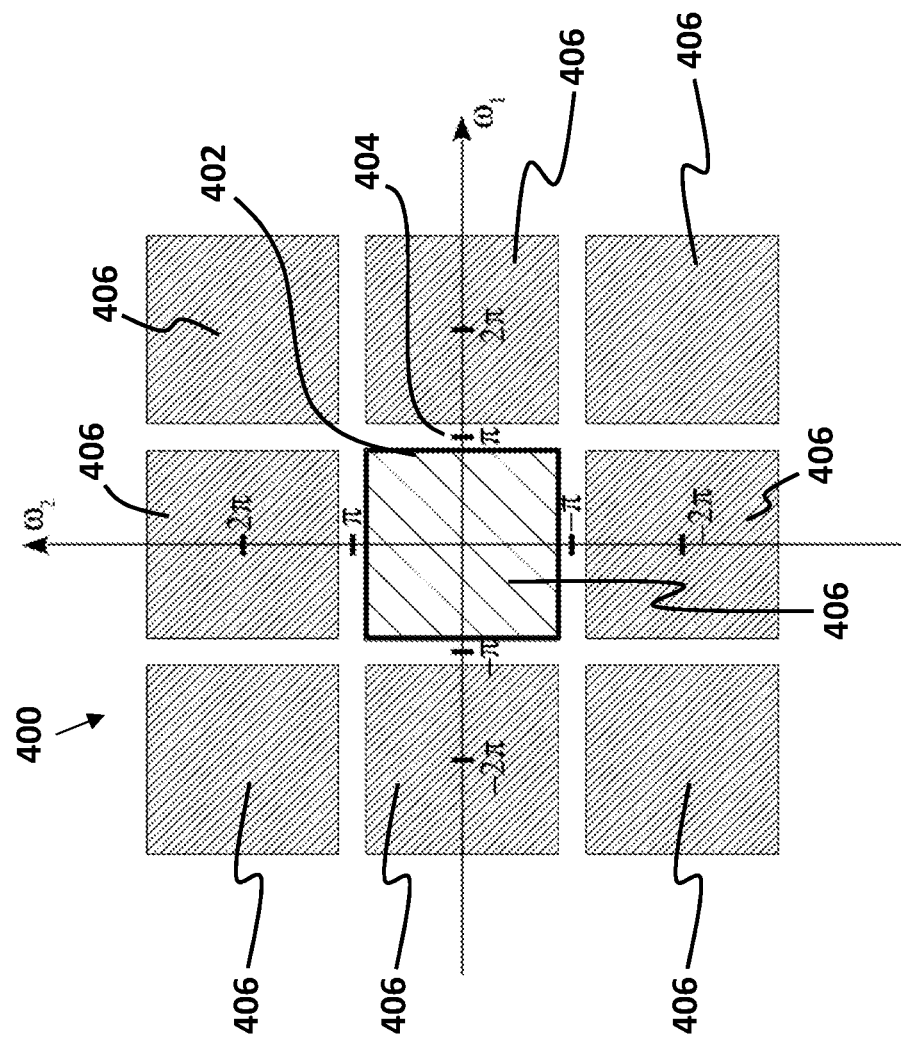
FIG. 4 is a schematic diagram illustrating a discrete space Fourier transform domain showing the region of support for the power spectral density function of the square aperture where the cutoff spatial frequency is less than the Nyquist folding frequency.
Figure 5:
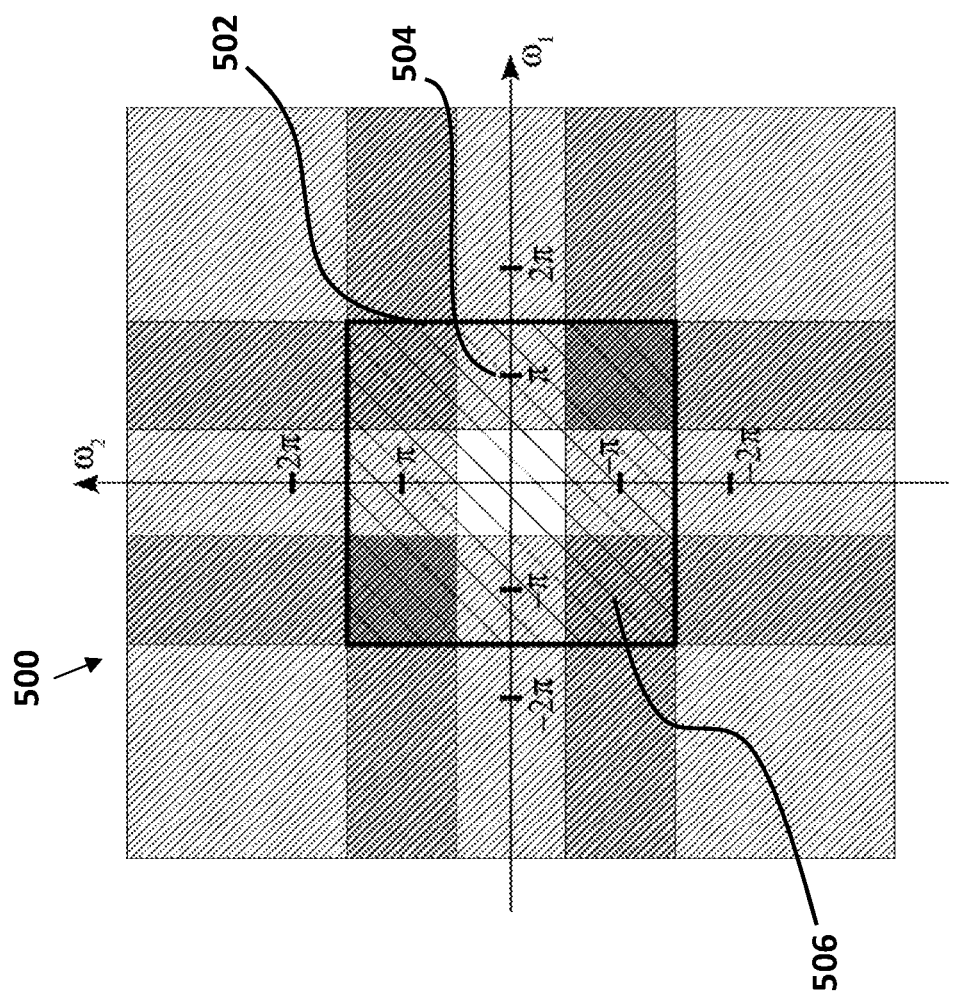
FIG. 5 is a schematic diagram illustrating a discrete space Fourier transform domain showing the region of support for the power spectral density function of the square aperture where the cutoff spatial frequency is greater than the Nyquist folding frequency and less than twice the Nyquist folding frequency.

FIG. 4 illustrates a discrete space Fourier transform domain 400 showing the region of support for the power spectral density function of the square aperture 116 where the cutoff spatial frequency 402 is less than the Nyquist folding frequency 404. In this case the magnitude of the transfer function (i.e., MTF) in Equation (4) can be solved provided both the input and output power spectral density functions are known or estimated using techniques like those above. Such an approach has an advantage in that it provides an estimate of the MTF that is automatically normalized to a value of unity at the origin. FIG. 5 illustrates a discrete space Fourier transform domain 500 showing the region of support for the power spectral density function of the square aperture 116 where the cutoff spatial frequency 502 is greater than the Nyquist folding frequency 504. When the cutoff frequency 502 of the power spectral density extends beyond the Nyquist folding frequency 504 as shown in FIG. 5, however, aliasing 506 (spectral overlap) occurs and recovery of the MTF using Equation (4) requires removing and sorting the individual aliased components. When the condition $\omega_{cutoff}=2\omega_{Nyquist}=2\pi$ is satisfied, the overlap of multiple spectral components can limit the ability to accomplish this even along the coordinate axes. As such, the frequency span for the MTF measurements can be limited when the aliased information overlaps with the baseband spectra as well as with other replicas of the baseband spectra. Exemplary embodiments herein overcome these difficulties by using a diamond-shape aperture having properties that allow for direct and unambiguous recovery of the aliased power spectral density.

Figure 6:
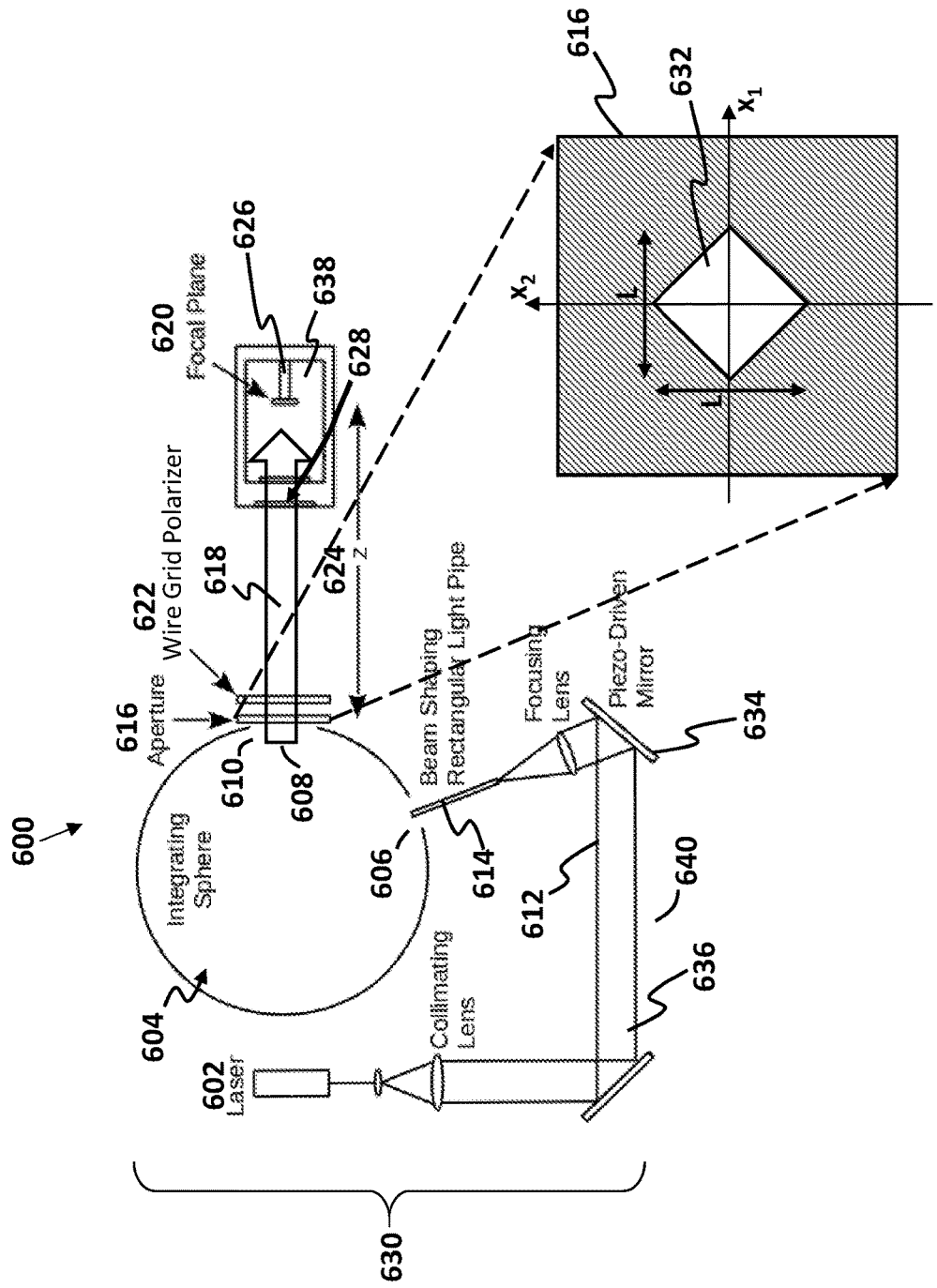
FIG. 6 is a schematic of a measurement apparatus for the MTF of a focal plane array having a diamond-shape aperture with a transmission value of one inside the diamond-shape and zero outside the diamond-shape.

An exemplary embodiment of a measurement apparatus 600 can be used in the thermal mid-wave infrared band and is shown in FIG. 6. The set up for other wavebands would be similar. A narrow linewidth laser source 602 illuminates an integrating sphere 604 through an input port 606 to generate a uniform speckle field 608 across a larger exit port 610. The laser 602 may incorporate linewidth narrowing devices such as grating structures to ensure sufficient coherence length for laser speckle generation. Such linewidth narrowing devices may be internal or external to the laser 602. The source radiation 612 such as a laser beam, may be expanded and then focused into the integrating sphere 604 to create a high divergence to improve the uniformity of the speckle field 608. Other options include direct fiber coupling into the integrating sphere 604. A light pipe 614 may also be used to remove spatial mode variations in the laser 602 to produce a more uniform speckle field 608.

The uniform speckle field 608 passes through an aperture 616 that is configured to shape the uniform speckle field 608 to have a predetermined power spectral density 618 when impinging the focal plane array 620. A polarizer 622 may be included to select a single linear polarization necessary to maximize the contrast of the laser speckle. Other methods may be known for generating a uniform speckle field, including using other types of lasers such as distributed feedback lasers and random microlens arrays instead of an integrating sphere. The polarizer 622, may be a high-quality SPECAC 2-in. (50.8 mm) diameter clear-aperture wire grid polarizer on a $CaF_2$ substrate to generate the linearly polarized speckle required for the focal plane array modulation transfer frequency measurement. For example, such a polarizer may have an extinction ratio of 662:1 at a 5 μm wavelength.

Mathematically, the diamond-shape aperture 616 function is given by Equation (5):

$$A_{diamond}(x_1, x_2) = rect\left(\frac{x_1 + x_2}{L}\right)rect\left(\frac{-x_1 + x_2}{L}\right), \quad (5)$$

Equation (6) is the corresponding power spectral density function for aperture 616:

$$G_{in}(\omega_1, \omega_2) = tri\left(\frac{\omega_1 + \omega_2}{\omega_{cutoff}}\right)tri\left(\frac{-\omega_1 + \omega_2}{\omega_{cutoff}}\right) \quad (6)$$

Figure 7:
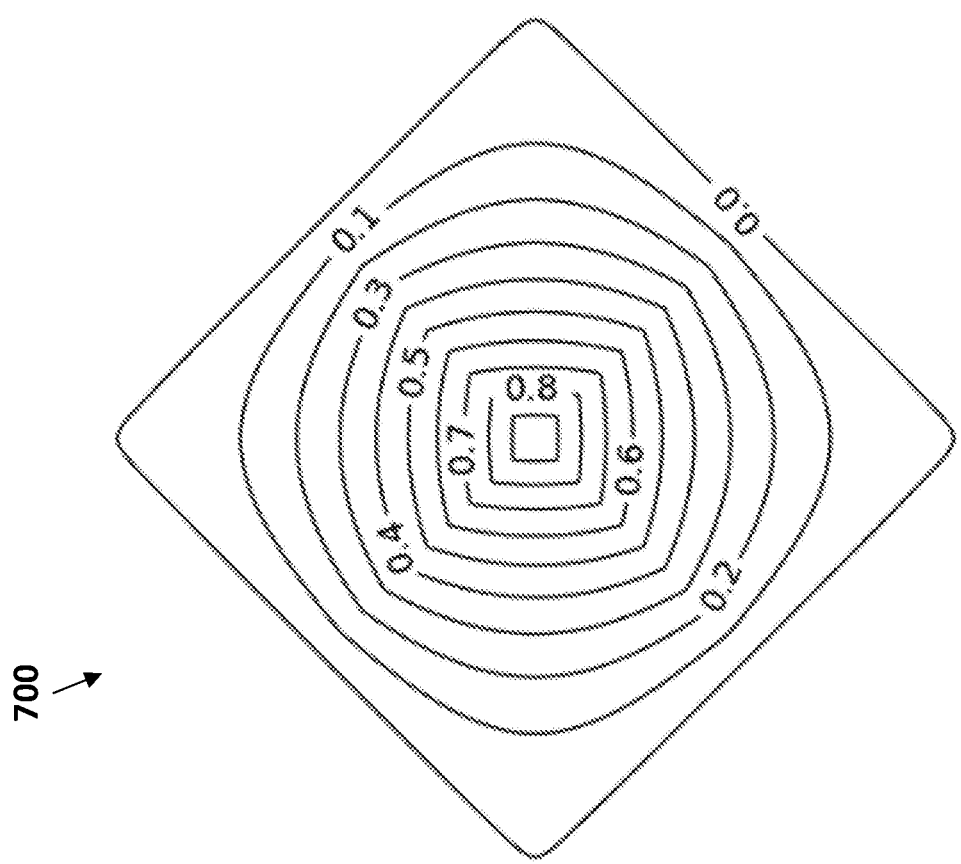
FIG. 7 is a schematic diagram illustrating a contour plot of the power spectral density function corresponding to the diamond-shape aperture of FIG. 6 with arbitrary units according to an embodiment herein. The power spectral density is given by the autocorrelation of the aperture.
Figure 8:
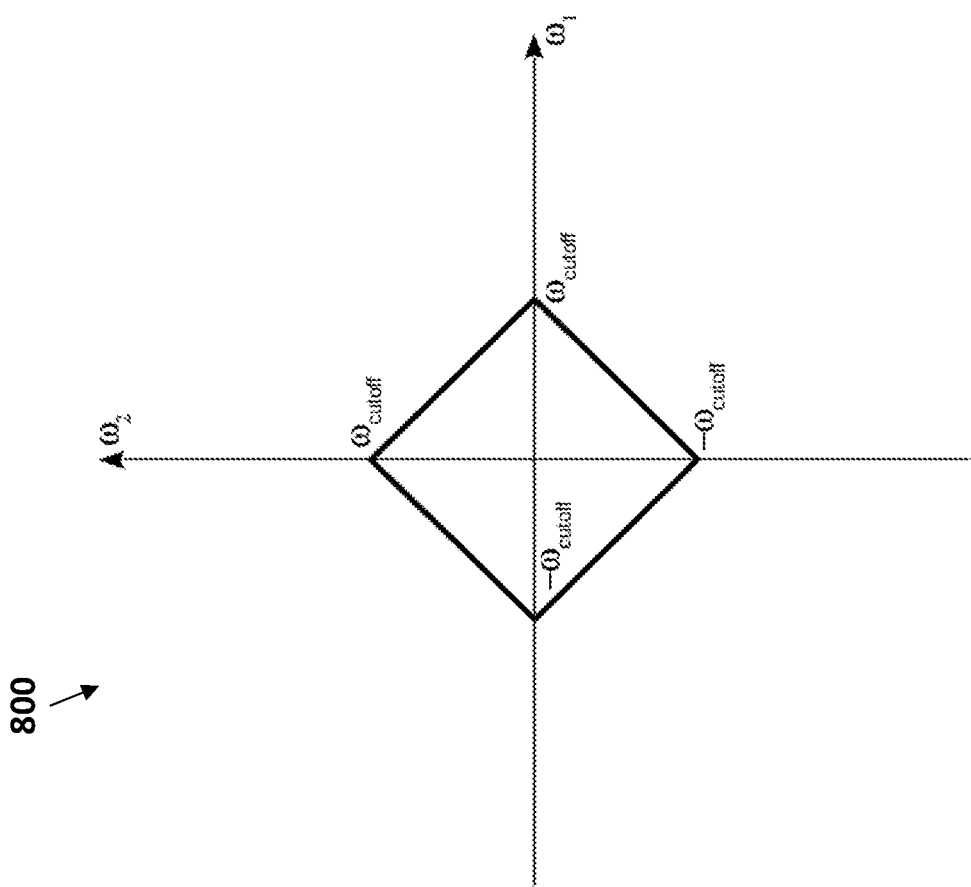
FIG. 8 is a schematic diagram illustrating a region of support for the power spectral density function of the diamond-shape aperture according to an embodiment herein.

In some embodiments, the diamond-shape aperture 616 may be a scaled and rotated square aperture. A contour plot of this function 700 and the region of support 800 are shown in FIGS. 7 and 8.

Figure 9:
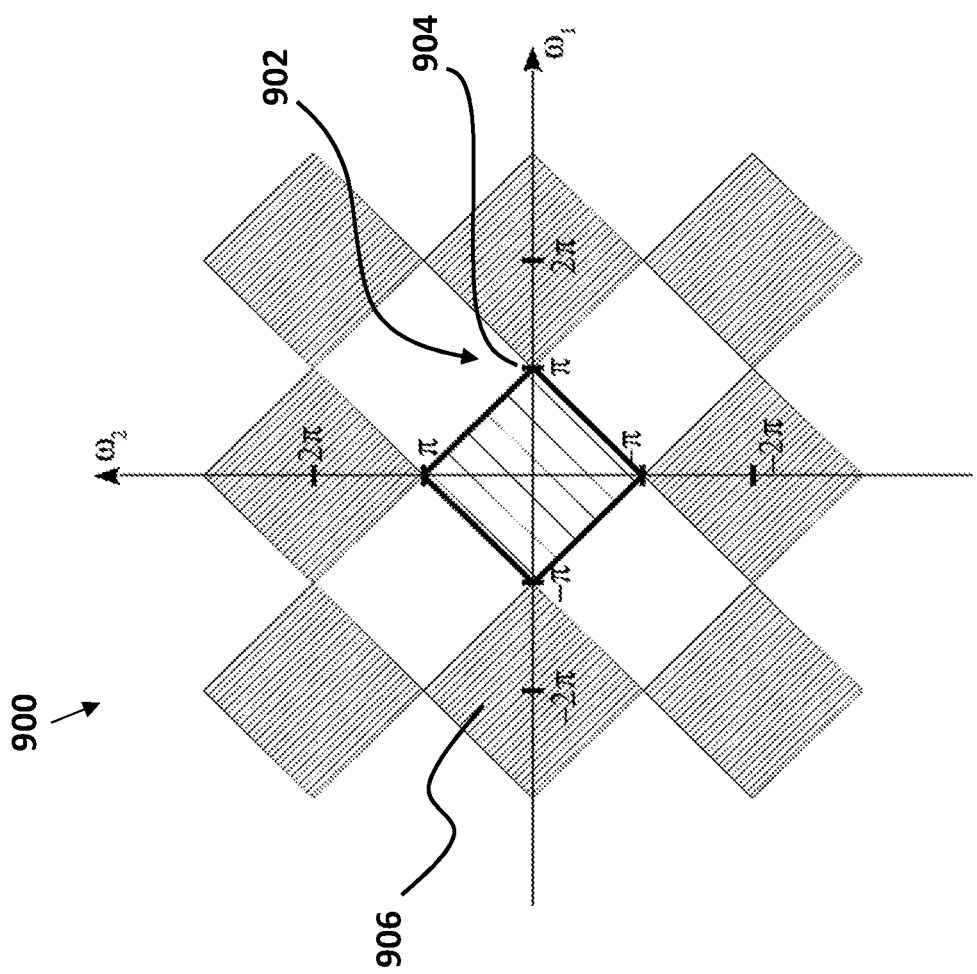
FIG. 9 is a schematic diagram illustrating a discrete space Fourier transform domain showing the region of support for the power spectral density function of the diamond-shape aperture where the cutoff spatial frequency is equal to the Nyquist folding frequency according to an embodiment herein.
Figure 10:
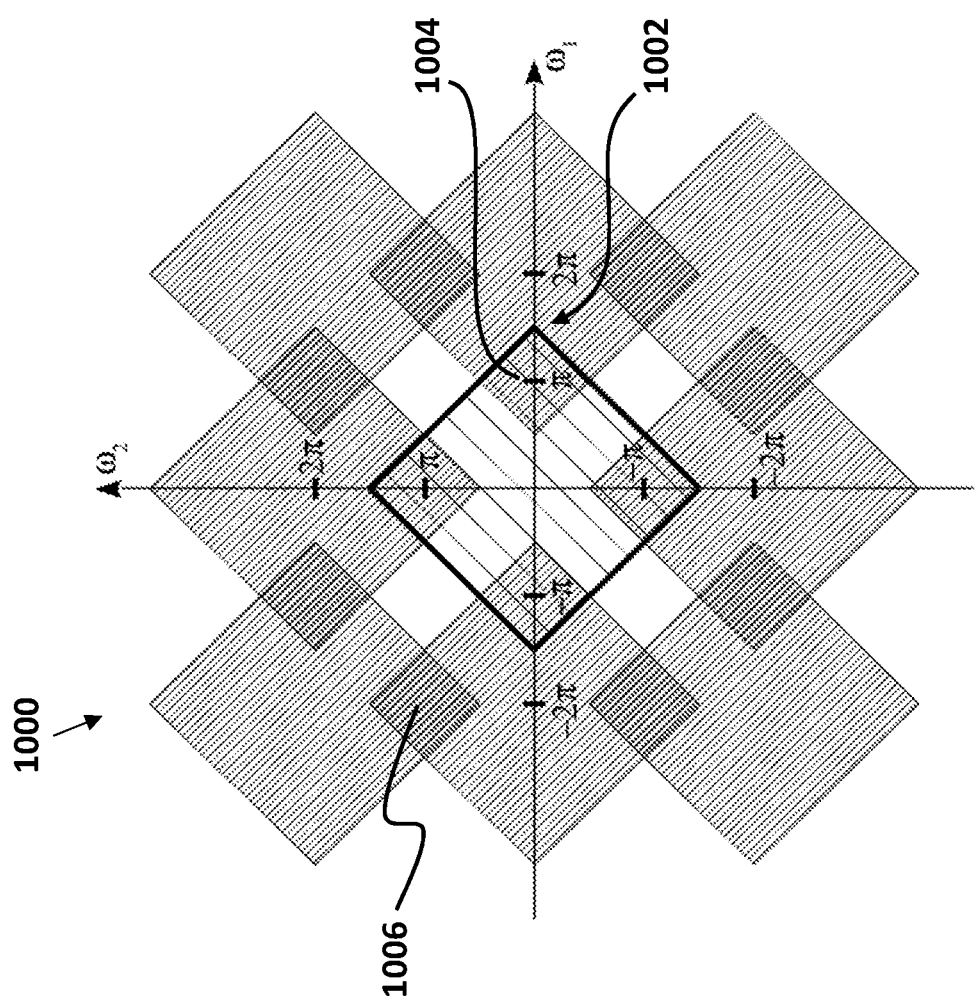
FIG. 10 is a schematic diagram illustrating a discrete space Fourier transform domain showing the region of support for the power spectral density function of the diamond-shape aperture where the cutoff spatial frequency is greater than the Nyquist folding frequency and less than twice the Nyquist folding frequency according to an embodiment herein.
Figure 11:
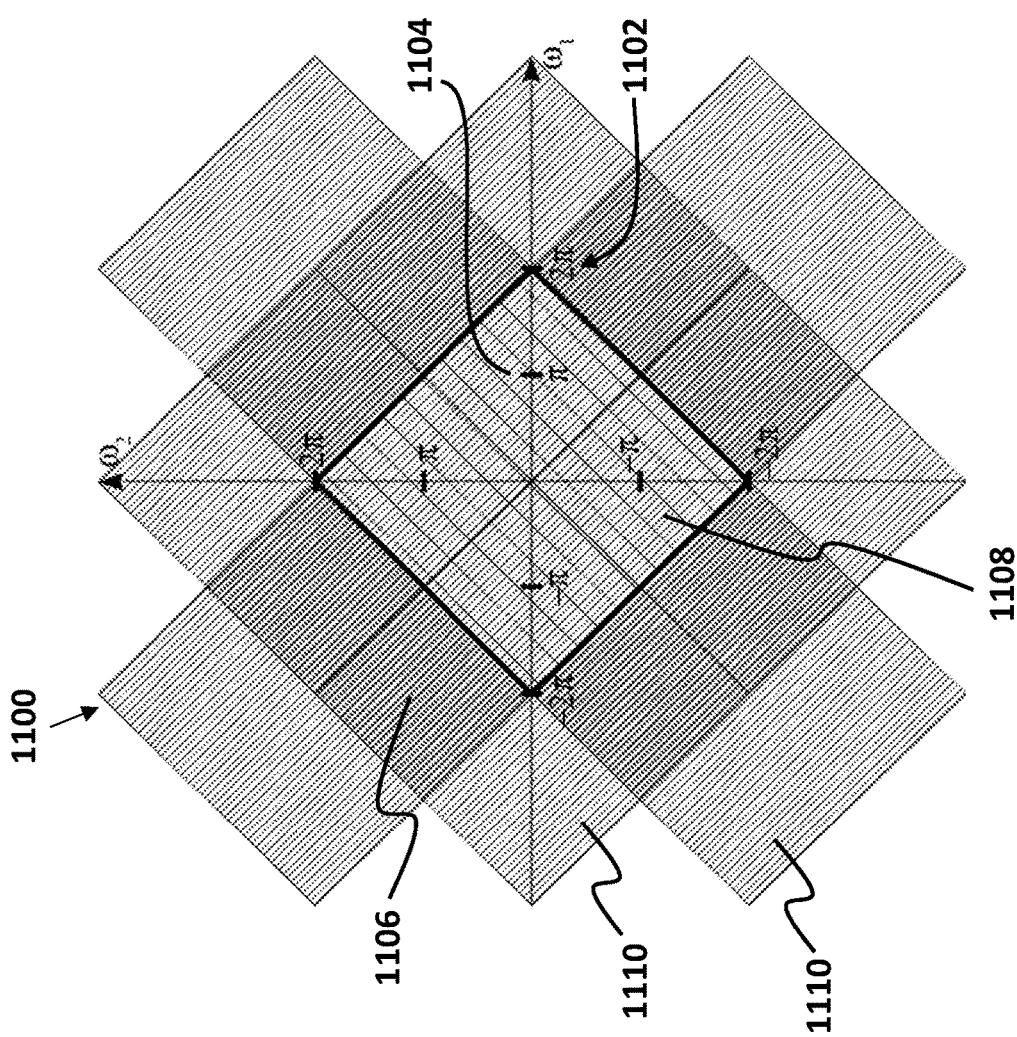
FIG. 11 is a schematic diagram illustrating a discrete space Fourier transform domain showing the region of support for the power spectral density function of the diamond-shape aperture where the cutoff spatial frequency is equal to twice the Nyquist folding frequency.

FIG. 9 illustrates a discrete space Fourier transform domain 900, showing the region of support for the power spectral density function of the diamond-shape aperture 616. Similar to the square aperture 116 with parameters chosen such that the cutoff spatial frequency 402 of the power spectral density is less than the Nyquist folding frequency 404, when the diamond-shape aperture 616 with parameters chosen such that the cutoff spatial frequency 902 of the power spectral density is less than the Nyquist folding frequency 904, the sampled speckle irradiance will have a periodic structure in the discrete space Fourier transform domain 900 as shown in FIG. 9. The replicated spectra 906 do not overlap and the modulation transfer function can be estimated by Equation (1). FIG. 10 illustrates another discrete space Fourier transform domain 1000 showing the region of support for the power spectral density function of the diamond-shape aperture 616. FIG. 10 illustrates the case where the cutoff spatial frequency 1002 of the power spectral density lies between about one and about two times the Nyquist folding frequency 1004. The overlaps in the periodic spectra 1006 are well-defined and there is no interference between the multiple components. FIG. 11 illustrates another discrete space Fourier transform domain 1100 showing the region of support for the power spectral density function of the diamond-shape aperture 616 when the cutoff spatial frequency 1102 equals twice the Nyquist folding frequency 1104. The overlaps in the periodic spectra 1106 are also well-defined in the case shown in FIG. 11, and there is no interference between the multiple components 1110, 1108. The interference or overlap 1106 is between only the baseband power spectral density 1108 and the periodic spectra 1110 with no cross contamination between the periodic spectra in contrast to the case with a square aperture, which has cross contamination 506 between the periodic spectra. For example, compare spectral overlap 506 in FIG. 5 with spectral overlaps 1006 and 1106 in FIGS. 10 and 11. That is, for illustration purposes, three square regions overlap at 506, whereas only two diamond regions overlap at 1006 and 1106 in the Fourier transform domain. An additional advantage of the diamond-shape aperture 616 is that its region of support 800 utilizes the spatial frequency domain more efficiently than a square aperture when the desired modulation transfer function measurement lies along the coordinate axes. The width of the aperture is largest along those directions, providing a larger cutoff spatial frequency for a given aperture size according to Equation (4).

Referring again to FIG. 6, in a first exemplary embodiment, the apparatus 600 to measure the resolution of the focal plane array 620 is disclosed. The apparatus 600 may include a speckle field source 630 to emit a uniform speckle field 608, a diamond-shape aperture 616, and a pedestal 626 as shown in FIG. 6. The speckle field source 630 may include a narrow linewidth laser source 602 illuminating an integrating sphere 604 through an input port 606 to generate the uniform speckle field 608 across the exit port 610. However, other speckle field generators may be used as the speckle field source 630.

The diamond-shape aperture 616 may include a diamond-shape opening 632 to shape the uniform speckle field 608 from the speckle field source 630 and generate a predetermined power spectral density function 618 at the focal plane array 620 when impinging on the array at a predetermined distance z 624 from the diamond-shape aperture 616. The pedestal 626 may be configured to mount the focal plane array 620 at the predetermined distance 624 from the aperture 616. The predetermined power spectral density function 618 comprises recoverable aliased regions out to two times the Nyquist frequency of the focal plane array 620.

In some aspects of the first embodiment, there may be no intervening optics between the diamond-shape aperture 616 and the focal plane array 620 to be analyzed. In some aspects of the first embodiment, the diamond-shape aperture 616 may be thin to avoid diffraction interference from the edge of the diamond-shape opening 632. For example, the aperture 616 may comprise an opaque sheet that blocks light transmittal and in at least one embodiment is less than 0.05 inches thick, and located at the diamond-shape opening 632. For example, the aperture 616 may comprise a steel sheet about 0.005 inches thick at the diamond-shape opening 632 and be disposed directly in front of the output 610 of the integrating sphere 604.

In some aspects of the first embodiment, the apparatus 600 may include any of a mirror 634 to reflect at least a portion of source radiation 612, a diffraction grating 636 to narrow the source radiation 612, a beam shaping light pipe 614 to remove spatial mode variations in the source radiation 612, a collimator 640 to collimate the source radiation 612, and the like, or a combination thereof. In these aspects, the source radiation 612 may be emitted from the narrow linewidth laser source 602.

A plurality of statistically independent realizations of the uniform speckle field may be generated and a plurality of the speckle irradiance images may be captured, each with a different random realization of the random speckle, in order to facilitate averaging to reduce variance in the estimated output power speckle density function. This may be accomplished by the laser source 602, the speckle generator 604, a mirror 634, the light pipe 614, or the like, or a combination thereof being configured to be physically moved.

In some aspects of the first embodiment, the focal plane array 620 may be packaged in off-the-shelf cameras where the focal plane array may be located inside a closed-cycle cryocooler 638. An additional narrowband filter 628 may be used to block extraneous broadband thermal radiation, and may be externally located from the cryocooler 638. For example, a filter manufactured by JDS Uniphase Corporation that has a center wavelength of 4.71 µm, a fullwidth-half-maximum bandwidth of 50 nm, a peak transmittance of greater than 85% and an out-of-band optical density of greater than three may be used. In some of these aspects, the pedestal may be a cold trap, such as a cold finger. Optionally, a warm filter in the system may be used, or for some wavelengths, such as in the visible wavelength band, the measurement can be performed in darkness. In cases where the FPA can be mounted in a pour-fill dewar an internal narrowband cold filter may be used to reduce self-emission and reflected radiation. To minimize vignetting of the speckle irradiance, the FPA may be mounted in a low f-number cold shield/aperture stop configuration.

Figure 12:
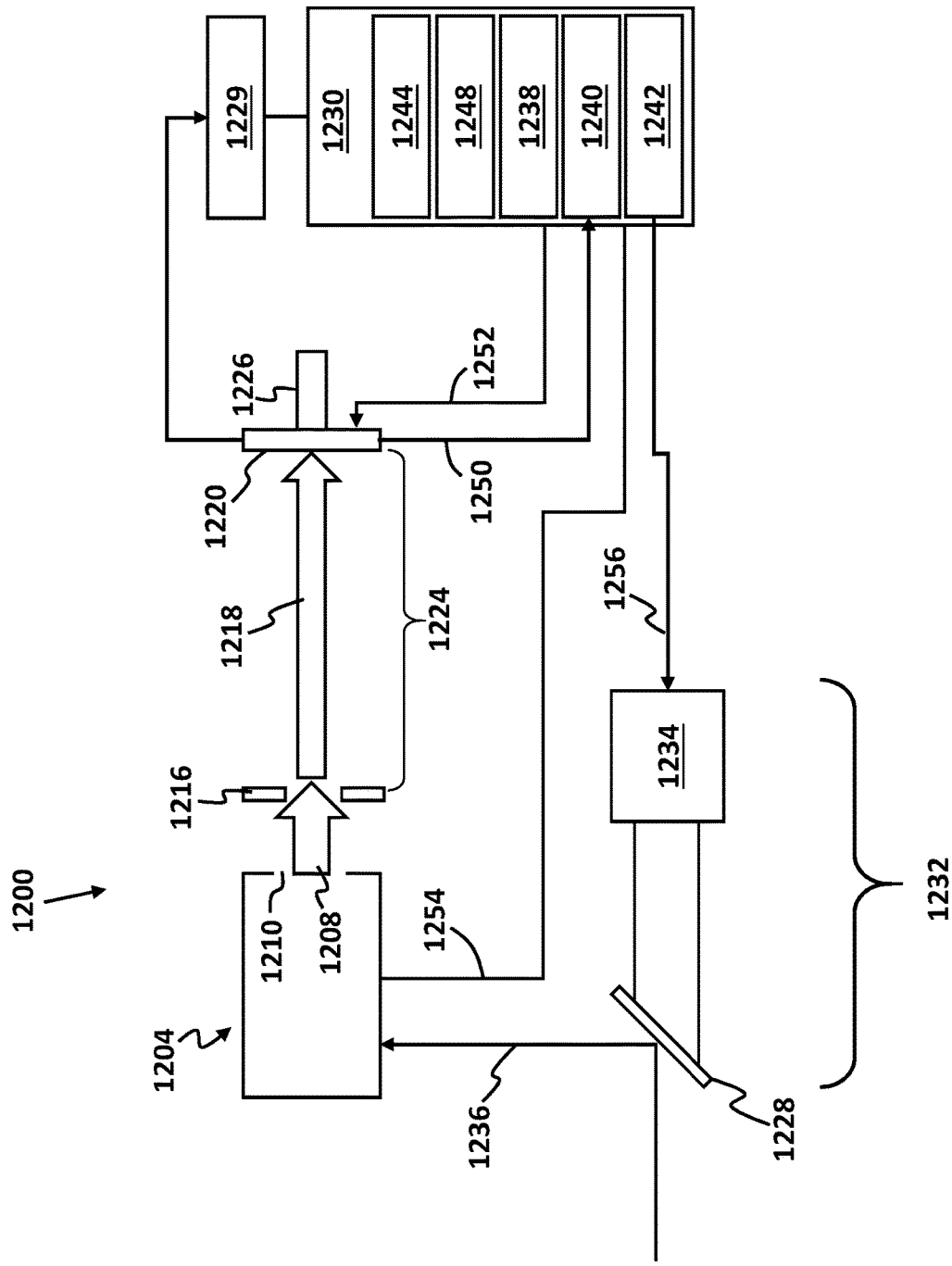
FIG. 12 is a schematic diagram illustrating a measurement system for the MTF of a focal plane array having a diamond-shape aperture and a controller according to an embodiment herein.

In a second exemplary embodiment, a system 1200 to measure the MTF of the focal plane array 1220 is disclosed as shown in FIG. 12 with reference to FIG. 6. The second exemplary embodiment may include all or any portion of the first exemplary embodiment including any aspects thereof which may not be described in further detail here for the benefit of clarity and brevity. The system 1200 may include a speckle field source 1204 to emit a uniform speckle field 1208, a diamond-shape aperture 1216 to shape the uniform speckle field 1208 from the speckle field source 1204 and generate a predetermined power spectral density function 1218 at a focal plane array 1220 to be analyzed at a predetermined distance 1224 from the aperture 1216. The predetermined power spectral density function 1218 may be a known speckle irradiance power spectral density incident on the focal plane array 1220 to be analyzed at the predetermined distance 1224. In this sense, the predetermined power spectral density function 1218 may be considered as an input power spectral density to the focal plane array 1220 to be analyzed. The speckle field source 1204 may emit the uniform speckle field 1208 at an exit 1210 thereof. The focal plane array 1220 may be disposed on a pedestal 1226. The focal plane array 1220 may collect the predetermined power spectral density function 1218 as input and output a measured speckle irradiance image.

A plurality of speckle irradiance images may be captured, each with a different random realization of the uniform speckle field, in order to facilitate averaging to reduce variance in the estimated output power speckle density function. This may be accomplished by physically moving a mirror 1228, or the like. For example, different random realizations of the uniform speckle field may be accomplished by moving the laser source, the speckle generator 1204, the mirror 1228, the light pipe, or the like, or a combination thereof. The system 1200 may include a processor 1229 to generate an output power spectral density function from the focal plane array 1220, a controller 1230 to measure the output power spectral density function from the focal plane array 1220 in response to the plurality of uniform speckle fields impinging on the focal plan array 1220, and compute a modulation transfer function of the focal plane array 1220 based on the predetermined power spectral density function 1218 at the focal plane array 1220 (as described above with regards to estimating the power spectral density of a speckle field) and the measured output power spectral density function 1218. The predetermined power spectral density function 1218 and the measured speckle irradiance image collected by the focal plane array 1220 may include recoverable aliased regions beyond the Nyquist folding frequency of the focal plane array and a spatial frequency range of the focal plane array 1220 may exceed the Nyquist folding frequency.

In some aspects of the second embodiment, referring to FIGS. 6 and 12, the speckle field source 630, 1204 may comprise a narrow linewidth laser 602 to emit source radiation 612, and a speckle field generator 630 to generate the uniform speckle field 608, 1208 from the source radiation 612 and emit the uniform speckle field 608, 1208. The speckle field generator 630, 1204 may be an integrating sphere 604, a diffuser, and the like, or a combination thereof. The system 1200 may further include a polarizer 622 to select a single linear polarization to increase contrast of the laser speckle in the uniform speckle field 608, 1208.

In some aspects of the second embodiment, the spatial frequency range of the random uniform speckle field relative to spatial sampling of the focal plane array 1220 may extend to twice the Nyquist folding frequency. Referring to FIGS. 6 and 12, the system 1200 may include a filter 638 configured to limit the spectral wavelength passband to the focal plane array 620, 1220 at the predetermined distance 624, 1224 from the aperture 616, 1216 and expose the focal plane array 620, 1220 to the predetermined power spectral density function 618, 1218.

In some aspects of the second embodiment, the system 1200 may include any of a mirror 634, 1228 to reflect at least a portion of source radiation 612, a diffraction grating 636 to narrow the source radiation 612, a beam shaping light pipe 614 to remove spatial mode variations in the source radiation 612, a collimator 640 to collimate the source radiation (as shown in FIG. 6), and the like, or a combination thereof. In these aspects, the source radiation 612 may be emitted from the narrow linewidth laser source 602.

The speckle field source 1204 may include a randomizer element 1232 to generate a plurality of statistically independent realizations of the uniform speckle field 1208 needed to estimate the power spectral density function 1218. In FIG. 6, for example, the randomizer element may move the source radiation 612 or the light pipe 614 in order to generate a different speckle realization for each captured image by the focal plane array 620, 1220. For example, the randomizer element 1232 may comprise a positioner 1234 on mirror 634, 1228 to change the angle of the source radiation 612, 1236 for example, the positioner may be piezo electric positioners. It will be understood that there may be other ways to move the source radiation 612, 1236 in order to generate a different speckle realization for each captured image by the focal plane array 620, 1220. For example, the randomizer element 1232 may move another element, such as the integrating sphere 604 or diffuser if used, resulting in the different statistically independent speckle realization effect.

In some aspects of the second embodiment, the controller 1230 may include a frame trigger module 1238, an image acquisition module 1240, a randomizer driver 1242, a storage device 1244, a display 1248, and the like, or a combination thereof. The frame trigger module 1238 may be configured to initiate capture of the speckle image at the focal plane array 1220. The image acquisition module 1240 may be configured to acquire the speckle image captured by the focal plane array 1220. The randomizer driver 1242 may be configured to control the positioner 1234, which may be a piezo amplifier, whereas the randomizer driver 1242 may be a piezo driver.

Exemplary embodiments herein also relate to an algorithm that allows the aliased power spectral density contained in the output power spectral density as measured by the focal plane array MTF to be recovered. In the algorithm, two speckle irradiance power spectral density measurements are performed. One measurement is made with parameters chosen such that $\omega_{cutoff} = \omega_{Nyquist}$ so no aliasing occurs in the discrete spatial frequency domain 900 as shown in FIG. 9. The output power spectral density, $G_{out}(\omega_1, \omega_2)$, as measured by the focal plane array MTF can be recovered by filtering out the replicated spectra such as shown in Equation (7):

$$G_{out}(\omega_1, \omega_2) = rect\left(\frac{\omega_1}{2\pi}\right)rect\left(\frac{\omega_2}{2\pi}\right)G_{in\_\pi}(\omega_1, \omega_2)|H_{FPA}(\omega_1, \omega_2)|^2, \quad (7)$$

where $G_{in\_\pi}$ is the power spectral density of the input speckle irradiance with $\omega_{cutoff} = \omega_{Nyquist} = \pi$. The MTF of the focal plane array, $H_{FPA}$, has a region of support larger than $G_{in\_\pi}$, but is physically limited by $G_{in\_\pi}$. A second measurement is made with the parameters chosen such that $\pi < \omega_{cutoff} \leq 2\omega_{Nyquist}$ resulting in aliasing of the power spectral density function similar that shown in FIGS. 10 and 11. For example, the predetermined distance z 624 from the diamond-shape aperture 616 may be adjusted such that $\pi < \omega_{cutoff} \leq 2\omega_{Nyquist}$ resulting in aliasing of the power spectral density function. The accessible output power spectral density is limited within the spatial frequency domain of $[-\pi, \pi)^2$ and the aliased output power spectral density is given as the sum of five components in Equation (8):

$$G_{out\_aliased}(\omega_1, \omega_2) = \quad (8)$$
$$rect\left(\frac{\omega_1}{2\pi}\right)rect\left(\frac{\omega_2}{2\pi}\right)[G_{in\_2\pi}(\omega_1, \omega_2)|H_{FPA}(\omega_1, \omega_2)|^2 +$$
$$G_{in\_2\pi}(\omega_1 - 2\pi, \omega_2)|H_{FPA}(\omega_1 - 2\pi, \omega_2)|^2 +$$
$$G_{in\_2\pi}(\omega_1, \omega_2 - 2\pi)|H_{FPA}(\omega_1, \omega_2 - 2\pi)|^2 +$$
$$G_{in\_2\pi}(\omega_1 + 2\pi, \omega_2)|H_{FPA}(\omega_1 + 2\pi, \omega_2)|^2 +$$
$$G_{in\_2\pi}(\omega_1, \omega_2 + 2\pi)|H_{FPA}(\omega_1, \omega_2 + 2\pi)|^2],$$

where $G_{in\_2\pi}$ is the power spectral density of the input speckle irradiance with a cutoff spatial frequency of $\pi < \omega_{cutoff} \leq 2\omega_{Nyquist}$. The simple form of the aliased components in Equation (8) is due to the diamond aperture shape preventing a more complex mixture of overlapping replicated spectra as described above with reference to comparing FIG. 5 to FIGS. 10 and 11. Using Equations (7) and (8) in combination allows the aliased components to be isolated from the non-aliased components. The output or measured power spectral density valid for spatial frequencies up to the Nyquist folding frequency without aliasing is determined based on Equation (7) as Equation (9):

$$G_{out\le\pi}(\omega_1, \omega_2) = G_{out}(\omega_1, \omega_2) \frac{G_{in_{2\pi}}(\omega_1, \omega_2)}{G_{in_\pi}(\omega_1, \omega_2)} = \quad (9)$$

$$tri\left(\frac{\omega_1 + \omega_2}{\pi}\right)tri\left(\frac{-\omega_1 + \omega_2}{\pi}\right)G_{in\_2\pi}(\omega_1, \omega_2)|H_{FPA}(\omega_1, \omega_2)|^2,$$

where the actual nonzero domain is emphasized by explicitly including the diamond shaped support. The inverse filtering and scaling in Equation (9) produces an output power spectral density function that is equivalent to the non-aliased term in Equation (8) along the coordinate axes. As implemented in Equation (9), the inverse filter is sensitive to noise and errors in estimation of the power spectral density. An alternative approach is to implement the operation as a Wiener filter or other variations of the inverse filter that are less sensitive and produce a more accurate estimate of $G_{out\le\pi}$.

The aliased components of the output power spectral density are found by subtracting the non-aliased baseband spectra in Equation (9) from the aliased power spectral density in Equation (8) as Equation (10):

$$G_{out\ge\pi}(\omega_1, \omega_2) = G_{out\_aliased}(\omega_1, \omega_2) - G_{out\_\pi}(\omega_1, \omega_2) = \quad (10)$$

$$rect\left(\frac{\omega_1}{2\pi}\right)rect\left(\frac{\omega_2}{2\pi}\right) \cdot \Big\{G_{in\_2\pi}(\omega_1 - 2\pi, \omega_2)|H_{FPA}(\omega_1 - 2\pi, \omega_2)|^2 +$$

$$G_{in\_2\pi}(\omega_1, \omega_2 - 2\pi)|H_{FPA}(\omega_1, \omega_2 - 2\pi)|^2 +$$

$$G_{in\_2\pi}(\omega_1 + 2\pi, \omega_2)|H_{FPA}(\omega_1 + 2\pi, \omega_2)|^2 +$$

$$G_{in\_2\pi}(\omega_1, \omega_2 + 2\pi)|H_{FPA}(\omega_1, \omega_2 + 2\pi)|^2 + \left[tri\left(\frac{\omega_1 + \omega_2}{2\pi}\right)\right.$$

$$\left.tri\left(\frac{-\omega_1 + \omega_2}{2\pi}\right) - tri\left(\frac{\omega_1 + \omega_2}{\pi}\right)tri\left(\frac{-\omega_1 + \omega_2}{\pi}\right)\right]$$

$$G_{in\_2\pi}(\omega_1, \omega_2)|H_{FPA}(\omega_1, \omega_2)|^2\Big\},$$

Figure 13:
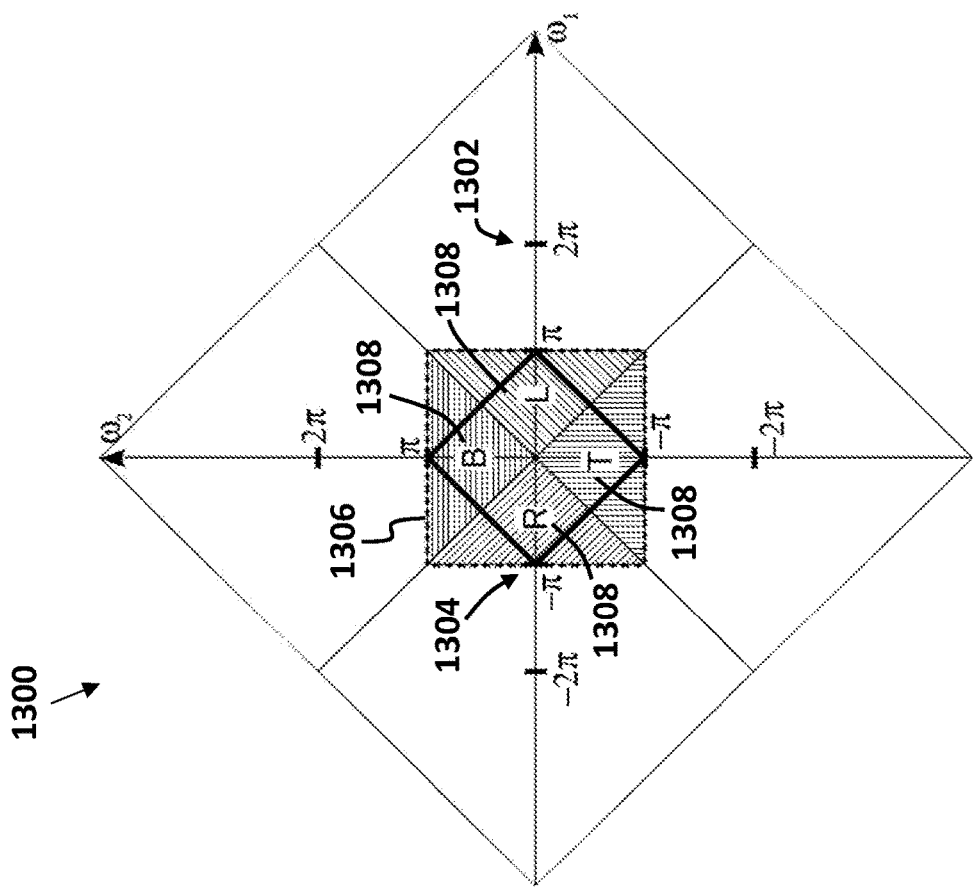
FIG. 13 is a schematic diagram illustrating aliased components of the power spectral density function of the diamond-shape aperture for the case where the cutoff spatial frequency is equal to twice the Nyquist folding frequency according to an embodiment herein. The dotted square indicates the accessible frequency domain and the labeled regions represent aliased overlap of the replicated spectra.

The last term in Equation (10) is the portion of the non-aliased spectra not included in Equation (9) that remains after the subtraction. All of the aliased terms in Equation (10) can be separated individually and added to the nonaliased power spectral density in Equation (9) to form a non-aliased power spectral density within an extended domain of $[-2\pi, 2\pi)^2$ in the spatial frequency space. These terms can be written as Equation (11):

$$G_{out\ge\pi\_Left}(\omega_1, \omega_2) = tri\left(\frac{\omega_1 + \omega_2}{\pi}\right)tri\left(\frac{-\omega_1 + \omega_2}{\pi}\right) \quad (11)$$

$$rect\left(\frac{\omega_1 + \omega_2 - 2\pi}{4\pi}\right)rect\left(\frac{-\omega_1 + \omega_2 + 2\pi}{4\pi}\right)G_{out\ge\pi}(\omega_1, \omega_2),$$

$$G_{out\ge\pi\_Bottom}(\omega_1, \omega_2) = tri\left(\frac{\omega_1 + \omega_2}{\pi}\right)tri\left(\frac{-\omega_1 + \omega_2}{\pi}\right)$$

$$rect\left(\frac{\omega_1 + \omega_2 - 2\pi}{4\pi}\right)rect\left(\frac{-\omega_1 + \omega_2 - 2\pi}{4\pi}\right)G_{out\ge\pi}(\omega_1, \omega_2),$$

$$G_{out\ge\pi\_Right}(\omega_1, \omega_2) = tri\left(\frac{\omega_1 + \omega_2}{\pi}\right)tri\left(\frac{-\omega_1 + \omega_2}{\pi}\right)$$

$$rect\left(\frac{\omega_1 + \omega_2 + 2\pi}{4\pi}\right)rect\left(\frac{-\omega_1 + \omega_2 - 2\pi}{4\pi}\right)G_{out\ge\pi}(\omega_1, \omega_2),$$

$$G_{out\ge\pi\_Top}(\omega_1, \omega_2) = tri\left(\frac{\omega_1 + \omega_2}{\pi}\right)tri\left(\frac{-\omega_1 + \omega_2}{\pi}\right)$$

$$rect\left(\frac{\omega_1 + \omega_2 + 2\pi}{4\pi}\right)rect\left(\frac{-\omega_1 + \omega_2 + 2\pi}{4\pi}\right)G_{out\ge\pi}(\omega_1, \omega_2),$$

where the notation in the subscript of the power spectral density components indicates the relative position where they need to be shifted to form the extended range power spectral density function as shown in FIG. 13. FIG. 13 is a schematic diagram illustrating aliased components 1300 of the power spectral density function of the diamond-shape aperture 616, 1216 for the case where the cutoff spatial frequency 1302 is equal to twice the Nyquist folding frequency 1304 according to an embodiment herein. The dotted square 1306 indicates the accessible frequency domain and the labeled regions ("B", "L", "T", "R") represent aliased overlap of the replicated spectra 1308. The extended range non-aliased output power spectral density is formed as a combination of Equations (9) and (10) given by Equation (12):

$$G_{out\_2\pi}(\omega_1,\omega_2) = G_{out\ge\pi\_Left}(\omega_1+2\pi,\omega_2) + G_{out\ge\pi\_Bottom}(\omega_1,\omega_2+2\pi) + G_{out\ge\pi\_Right}(\omega_1-2\pi,\omega_2) + G_{out\ge\pi\_Top}(\omega_1,\omega_2-2\pi) + G_{out\le\pi}(\omega_1,\omega_2), \quad (12)$$

Figure 14:
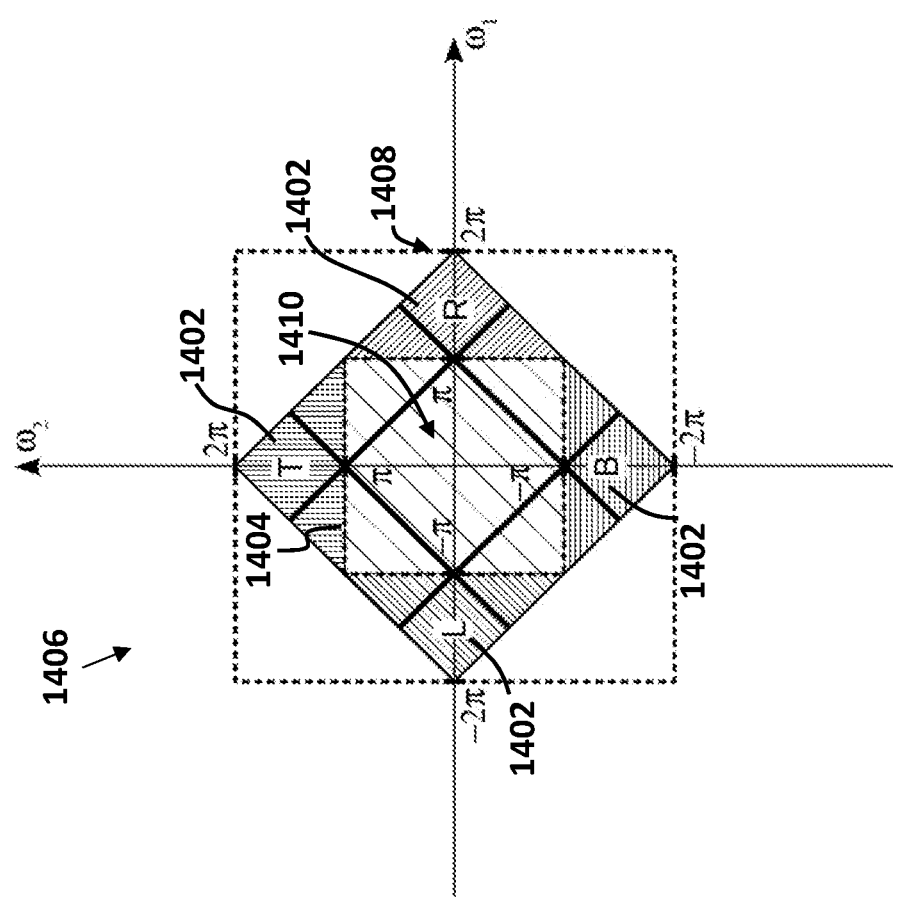
FIG. 14 is a schematic diagram illustrating recovered aliased components of the power spectral density added to the non☐aliased domain providing an expanded domain out to twice the Nyquist folding frequency along the coordinate axes according to an embodiment herein. Valid data exists within the central diamond region and the smaller labeled diamond regions at the corners of the central diamond.
Figure 15:
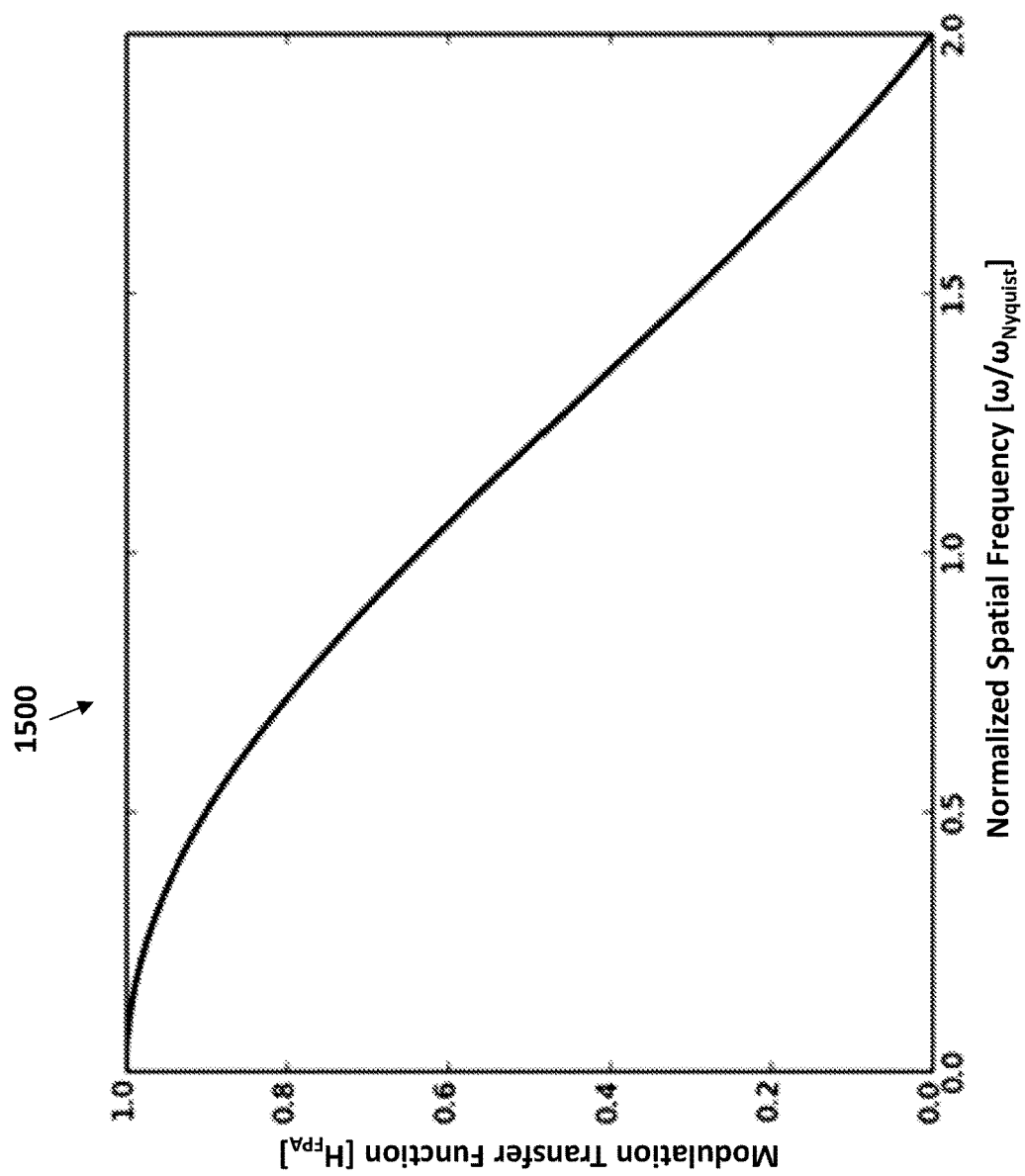
FIG. 15 is a schematic diagram illustrating a slice of a recovered modulation transfer function out to twice the Nyquist folding frequency along a coordinate axis assuming an ideal square detector active area and a 100% fill factor according to an embodiment herein.

The non aliased power spectral density function $G_{out\_2\pi}(\omega_1,\omega_2)$ has a region of support defined as Equation (13):

$$G_{out\_2\pi}: tri\left(\frac{\omega_1 + \omega_2}{\pi}\right)tri\left(\frac{-\omega_1 + \omega_2}{\pi}\right) + \quad (13)$$

$$tri\left(\frac{\omega_1 + \omega_2 - 3\pi/2}{\pi/2}\right)tri\left(\frac{-\omega_1 + \omega_2 + 3\pi/2}{\pi/2}\right) +$$

$$tri\left(\frac{\omega_1 + \omega_2 - 3\pi/2}{\pi/2}\right)tri\left(\frac{-\omega_1 + \omega_2 - 3\pi/2}{\pi/2}\right) +$$

$$tri\left(\frac{\omega_1 + \omega_2 + 3\pi/2}{\pi/2}\right)tri\left(\frac{-\omega_1 + \omega_2 - 3\pi/2}{\pi/2}\right) +$$

$$tri\left(\frac{\omega_1 + \omega_2 + 3\pi/2}{\pi/2}\right)tri\left(\frac{-\omega_1 + \omega_2 + 3\pi/2}{\pi/2}\right),$$

as a result the unknown component remaining in Equation (10) can be found, as shown in FIG. 14.

FIG. 14 is a schematic diagram illustrating recovered aliased components 1402 of the power spectral density added to the non-aliased domain 1404 providing an expanded domain 1406 out to twice the Nyquist folding frequency 1408 along the coordinate axes according to an embodiment herein. Valid data exists within the central diamond region 1410 and the smaller labeled diamond regions 1402 at the corners of the central diamond.

Any discontinuity at the Nyquist folding frequency can be minimized through interpolation methods appreciated by those skilled in the art. Solving for $|H_{FPA}|$ in Equation (12), the modulation transfer function of the focal plane array can be recovered beyond the Nyquist folding frequency limit within the domain defined in Equation (13). This method provides a measurement of modulation transfer function out to twice the Nyquist folding frequency along the coordinate axes, $|H_{FPA}(\omega_1,0)|$ or $|H_{FPA}(0,\omega_2)|$. Since the power spectral density is defined over the full domain, the resulting modulation transfer function is automatically normalized such that it has a value of unity at the origin. Assuming a focal plane array with an ideal square detector active area and a 100% fill factor, the described technique produces a measured modulation transfer function 1500 along the coordinate axes similar to that shown in FIG. 15.

In some aspects of the second embodiment herein, the algorithm may be executed by the controller 1230. Referring to FIG. 12, in the system 1200, the controller 1230 may be configured to receive a first data set of random uniform speckle field collected by the focal plane array 1220 under aliased condition, for example at a first predetermined distance z 1224, to receive a second data set of random uniform speckle field collected by the focal plane array 1220 under non-aliased condition, for example at a second predetermined distance z 1224, to produce a signal without aliasing artifacts from the first data set and the second data set, and to compute a modulation transfer function of the focal plane array 1220 based on the produced signal. The controller 1230 may receive the first data set and the second data through communication channel 1250, which can be any of a number of wired or wireless communication channels. In addition, the controller 1230 may control focal plane array 1220 through wire 1252 or wirelessly to trigger the focal plane array 1220 to capture the speckle image. The controller 1230 may also control speckle field source 1204 through wires 1254, 1256 or wirelessly to adjust the uniform speckle field 1208 to generate the statistically independent realizations of the uniform speckle field 1208 and the predetermined power spectral density function 1218. The controller 1230 may output the computed modulation transfer function of the focal plane array 1220 to a user by the display monitor 1244, printout, and the like, or stored in the storage device 1248 for further calculations or to be retrieved by a user or another algorithm.

In some aspects of the second embodiment herein, the first data set and the second data set are collected by at least one of an approximation in the Fresnel optical regime and a numerical computation from the Rayleigh-Summerfeld diffraction formula. In some aspects of the second embodiment herein, to determine the modulation transfer function, an estimate of the power spectral density of the image of the random uniform speckle field as measured by the focal plane array 1220 is formed based on Welch's procedure where a series of overlapping windowed periodogram estimates are averaged for each speckle image frame.

Figure 16:
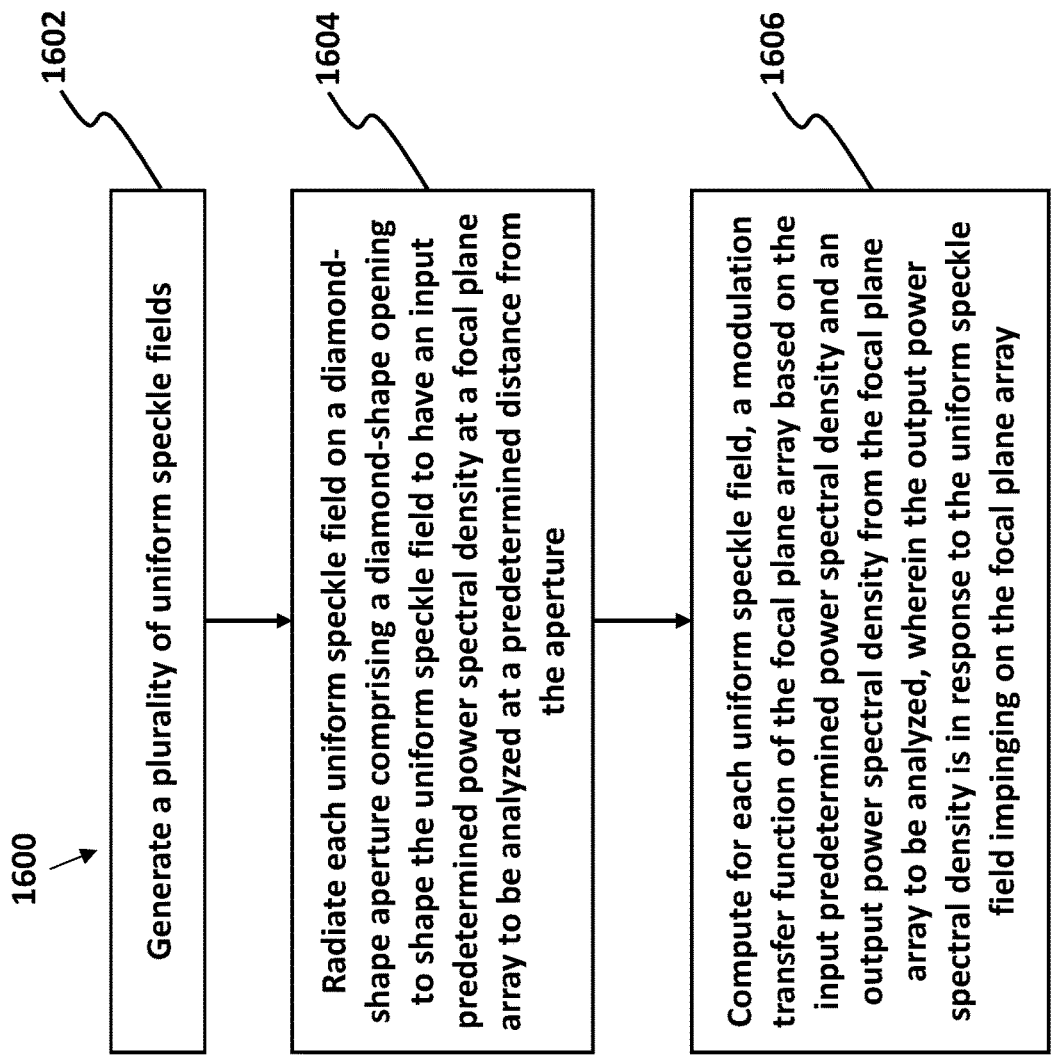
FIG. 16 is a flow diagram illustrating a method of measuring the resolution of a focal plane array according to an embodiment herein.

In a third exemplary embodiment, a method 1600 of measuring the resolution of the focal plane array 620, 1220 is disclosed as shown in FIG. 16 with reference to FIGS. 6 through 15. The third exemplary embodiment may include all or any portion of the first and second exemplary embodiments including any aspects thereof which may not be described in further detail here for the benefit of clarity and brevity. The method 1600 of the third embodiment may include generating (1602) a plurality of uniform speckle fields. Each of the plurality of uniform speckle field may have a difference random realization of the random uniform speckle field in order to facilitate averaging to reduce variance in the estimated output power speckle density function. The method 1600 may include radiating (1604) the uniform speckle field 608, 1208 on the diamond-shape aperture 616, 1216 comprising a transmission value of one inside a diamond-shape opening 632 and zero outside of the diamond-shape opening 632 to shape the uniform speckle field 608, 1208 and generate a predetermined power spectral density function 618, 1218 at a focal plane array 620, 1220 to be analyzed at a predetermined distance z 624, 1224 from the aperture. The method 1600 may also include computing (1606) a modulation transfer function of the focal plane array 620, 1220 based on the predetermined power spectral density function at the focal plane array 620, 1220 and an output power spectral density function from the focal plane array to be analyzed. Estimation of the output power spectral density function can be accomplished using standard techniques, such as Welch's procedure or periodogram averaging. In the method 1600, a spatial frequency range of the focal plane array 620, 1220 may exceed the Nyquist folding frequency.

Figure 17A:
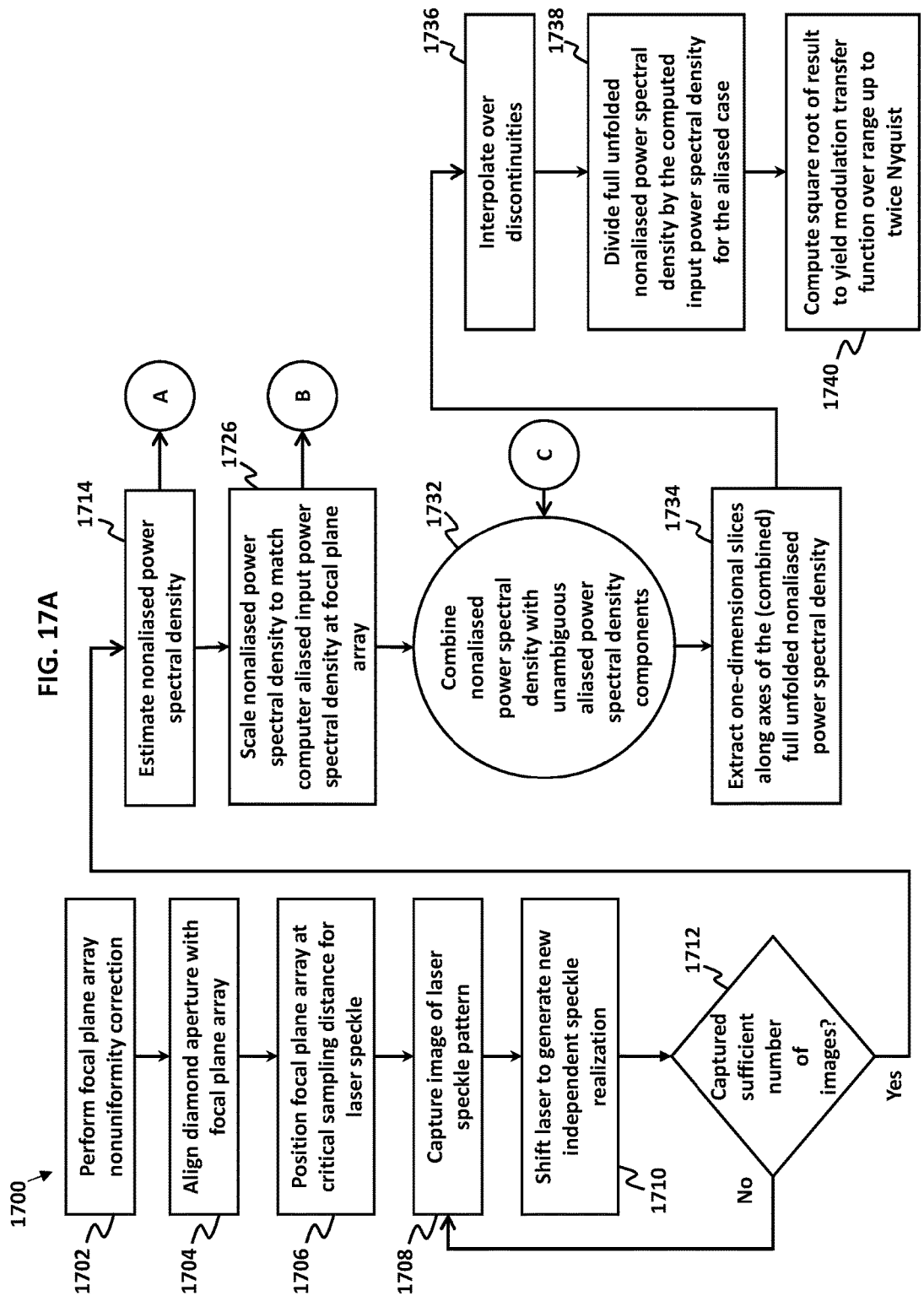

In further detail of some aspects of the third embodiment, as shown in FIGS. 17A and 17B, a method 1700 may include correcting the focal plane array 620, 1220 under test for spatial response nonuniformity using standard spatial nonuniformity correction techniques in block (1702). The diamond-shape aperture 616, 1216 of predetermined dimensions may be aligned with vertical and horizontal axes of the focal plane array 620, 1220 under test in block (1704). The focal plane array may be positioned at the predetermined distance z 624, 1224 from the diamond-shape aperture 616, 1216 such that the random laser speckle field is critically sampled by the focal plane array 620, 1220 and no aliasing occurs in block (1706).

A stationary random laser speckle field may be captured by the focal plane array 620, 1220 and stored in computer memory 1248 in block (1708). The measurement setup may be adjusted to generate a new random laser speckle field realization independent from the previous pattern, for example through small changes in the laser 602 pointing angle or as described above using a randomizer element 1232 in block (1710). The procedures in blocks (1708) and (1710) may be repeated until a predetermined number of speckle images are collected sufficient to estimate the two-dimensional power spectral density in block (1712). The non-aliased power spectral density may be estimated using a technique such as Welch's periodogram averaging in block (1714).

The focal plane array 620, 1220 may be repositioned closer to the diamond-shaped aperture 616, 1216, at a distance greater than or equal to half the previous distance in block (1706) such that the random laser spectral pattern is under sampled up to twice the Nyquist folding frequency defined by the focal plane array sampling in block (1716). The stationary random laser speckle field may be captured by the focal plane array 620, 1220 and stored in computer memory 1248 in block (1718). The randomizer element 1232 may be adjusted to generate a new random laser speckle field realization independent from the previous pattern, for example, through small changes in the laser 602 pointing angle in block (1720). The procedures in blocks (1718) and (1720) may be repeated until a predetermined number of speckle images are collected sufficient to estimate the two-dimensional power spectral density in block (1722). The aliased power spectral density may be estimated using a technique such as Welch's periodogram averaging in block (1724).

The non-aliased power spectral density in block (1714) may be scaled to match the computed power spectral density incident on the focal plane array 620, 1220 for the aliased capture case in block (1726). The scaled non-aliased power spectral density may be subtracted from the aliased power spectral density in block (1728). The remainder of the modified aliased power spectral density containing the unambiguous components that were aliased may be sorted in block (1730) and combined with the non-aliased scaled power spectral density in block (1732). One-dimensional slices along the coordinated axes of the combined non-aliased power spectral density may be extracted to contain the non-aliased power spectral density valid for spatial frequencies up to twice the Nyquist folding frequency in block (1734). Any discontinuity in the extended (combined) non-aliased power spectral density may be removed through interpolation in block (1736). The one-dimensional extended non-aliased power spectral density may be divided by the computed power spectral density incident on the focal plane array and a square root of the result may yield an estimate of the non-aliased modulation transfer function valid up to twice the Nyquist folding frequency in block (1740).

In some aspects of the third embodiment, generating a uniform speckle field 608, 1208 in step (1602) of FIG. 16 may comprise irradiating at least one of an integrating sphere 604 and a diffuser. The method 1600 may further include polarizing the uniform speckle field 608, 1208 prior to radiating the uniform speckle field 608, 1208 on the aperture 616, 1216. In the method 1600, the spatial frequency range of the focal plane array 620, 1220 may extend to twice the Nyquist folding frequency. The method 1600 may further include a spectral wavelength passband filtering of the uniform speckle field 608, 1208 prior to the focal plane array 620, 1220.

In some aspects of the third embodiment, in the method 1600, the computing step (1606) may include receiving a first data set of random uniform speckle field collected by the focal plane array 620, 1220 under aliased condition, receiving a second data set of random uniform speckle field collected by the focal plane array 620, 1220 under non-aliased condition, producing a signal without aliasing artifacts from the first data set and the second data set, and computing the modulation transfer function of the focal plane array 620, 1220 based on the produced signal.

In some aspects of the third embodiment, in the method 1600, the first data set and second data set may be collected by at least one of an approximation in the Fresnel optical regime and a numerical computation from the Rayleigh-Summerfeld diffraction formula.

The embodiments described herein may be used by focal plane array manufacturers to specify the performance of products and in the design and development of focal plane arrays to optimize performance. Other applications may include measuring performance of focal plane array as components by imaging sensor system developers to determine system performance.

Aspects of the embodiments described herein address the need to characterize the performance of focal plane arrays to provide product specifications, to perform system level performance trades in imaging sensors, and to optimize the design of detector structures to maximize performance. The embodiments herein provide direct, rather than typically indirect, measurement capability of the resolution of a focal plane array that does not require intervening imaging optics. This allows the performance of the focal plane array and electronics to be assessed independently of other components in an imaging sensor.

Other aspect of embodiments disclosed herein can overcome current limitations of the random uniform speckle field modulation transfer function method by allowing the modulation transfer function of the focal plane array to be measured beyond the current limits up to twice the Nyquist folding frequency while simultaneously self-normalizing the results for improved accuracy. The embodiments disclose both hardware and a processing algorithm to achieve the desired result. The method inherently leads to high signal-to-noise level through utilization of a relatively large area diamond-shaped aperture for maximum transmission. The diamond shape of the aperture was surprisingly discovered to enable the unique measurement capabilities by controlling the characteristics of any aliased, otherwise unrecoverable information. The embodiments disclose collecting two data sets consisting of random uniform speckle field collected by the focal plane array under aliased and nonaliased conditions. The diamond☐shape aperture controls how the aliasing occurs and by using a de-aliasing algorithm a complete signal without any aliasing artifacts can be recovered by processing both data sets. The full modulation transfer function of the focal plane array is then computed from the result. The method is robust and requires only the statistical properties of the random uniform speckle field impinging on the focal plane array, whether approximated in Fresnel optical regime or computed numerically from the Rayleigh☐Summerfeld diffraction formula.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A system to characterize a focal plane array having a Nyquist folding frequency, the system comprising: a speckle field source to emit a plurality of uniform speckle fields; the focal plane array disposed at a predetermined distance from a diamond-shape aperture disposed between the speckle field source and the focal plane array, the diamond-shape aperture being configured to shape the plurality of uniform speckle fields to have, at the predetermined distance, a predetermined power spectral density comprising recoverable aliased regions beyond the Nyquist folding frequency of the focal plane array; a processor to generate an output power spectral density function from the focal plane array; and a controller configured to: measure the output power spectral density function from the focal plane array in response to the plurality of uniform speckle fields impinging on the focal plane array, and compute a modulation transfer function of the focal plane array based on the predetermined power spectral density and the measured output power spectral density function wherein the controller is configured to receive a first data set of at least one random uniform speckle field collected by the focal plane array under aliased condition, to receive a second data set of at least one random uniform speckle field collected by the focal plane array under non-aliased condition, to produce a signal without aliasing artifacts from the first data set and the second data set, and to compute a modulation transfer function of the focal plane array based on the produced signal.

2. The system of claim 1, wherein the speckle field source comprises:
    a narrow linewidth laser to emit source radiation; and
    a speckle field generator to generate a uniform speckle field from the source radiation and emit the uniform speckle field, wherein the speckle field generator comprises at least one of an integrating sphere and a diffuser.

3. The system of claim 2, further comprising at least one of a mirror to reflect at least a portion of the source radiation, a diffraction grating to narrow the source radiation, a beam shaping light pipe to remove spatial mode variations in the source radiation, and a collimator to collimate the source radiation.

4. The system of claim 1, further comprising a polarizer to select a single linear polarization to increase contrast of a laser speckle in at least one uniform speckle field.

5. The system of claim 1, further comprising a randomizer configured to adjust the speckle field source to generate a plurality of statistically independent realizations of at least one uniform speckle field.

6. The system of claim 1, further comprising a filter configured to limit a spectral wavelength passband to the focal plane array at the predetermined distance from the aperture and expose the focal plane array to a predetermined power spectral density function.

7. The system of claim 1, wherein the first data set and the second data set are collected by at least one of a Fresnel optical regime approximation and a Rayleigh-Summerfeld diffraction formula computation.

8. A method of characterizing a focal plane array, the method comprising:
   generating a plurality of uniform speckle fields;
   radiating each uniform speckle field on a diamond-shape aperture comprising a transmission value of one inside a diamond-shape pattern and zero outside of the diamond-shape pattern to shape the uniform speckle field to have a predetermined power spectral density at the focal plane array when at a predetermined distance from the aperture; and
   computing, for each uniform speckle field, a modulation transfer function of the focal plane array based on:
   the predetermined power spectral density; and
   an output power spectral density from the focal plane array,
   wherein the output power spectral density is in response to the uniform speckle field impinging on the focal plane array, wherein the computing comprises:
   receiving a first data set of at least one first random uniform speckle field collected by the focal plane array under aliased condition;
   receiving a second data set of at least one second random uniform speckle field collected by the focal plane array under non-aliased condition;
   producing a signal without aliasing artifacts from the first data set and the second data set and computing the modulation transfer function of the focal plane array based on the produced signal.

9. The method of claim 8, wherein generating the uniform speckle field comprises irradiating at least one of an integrating sphere and a diffuser.

10. The method of claim 8, further comprising polarizing the uniform speckle field prior to radiating the uniform speckle field on the aperture.

11. The method of claim 8, further comprising randomizing each uniform speckle field from the other uniform speckle fields.

12. The method of claim 8, further comprising spectral wavelength passband filtering the uniform speckle field prior to the focal plane array.

13. The method of claim 8, wherein the first data set and second data set are collected by at least one of a Fresnel optical regime approximation and a Rayleigh-Summerfeld diffraction formula numerical computation.

\* \* \* \* \*